US012617214B2

(12) United States Patent
Takagiwa

(10) Patent No.: US 12,617,214 B2
(45) Date of Patent: May 5, 2026

(54) PROCESSING LIQUID APPLICATION DEVICE

(71) Applicant: BROTHER KOGYO KABUSHIKI KAISHA, Nagoya (JP)

(72) Inventor: Yutaka Takagiwa, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 123 days.

(21) Appl. No.: 18/590,082

(22) Filed: Feb. 28, 2024

(65) Prior Publication Data

US 2024/0326458 A1 Oct. 3, 2024

(30) Foreign Application Priority Data

Mar. 30, 2023 (JP) ................................. 2023-055447

(51) Int. Cl.

*B41J 11/00* (2006.01)
*B41J 2/175* (2006.01)
*B41J 2/185* (2006.01)
*B41J 11/06* (2006.01)
*B41M 5/00* (2006.01)

(52) U.S. Cl.

CPC ............... *B41J 2/185* (2013.01); *B41J 2/175* (2013.01); *B41J 11/06* (2013.01)

(58) Field of Classification Search

CPC .. B41J 11/0015; B41M 5/0011; B41M 5/0017
See application file for complete search history.

(56) References Cited

U.S. PATENT DOCUMENTS

2015/0273866 A1 10/2015 Sakai
2019/0100047 A1* 4/2019 Tamaki .................. B05B 12/00
2021/0316319 A1* 10/2021 Park ....................... B05B 3/025

FOREIGN PATENT DOCUMENTS

JP 2015183331 A 10/2015

* cited by examiner

*Primary Examiner* — Scott A Richmond
(74) *Attorney, Agent, or Firm* — HOGAN LOVELLS US LLP

(57) ABSTRACT

There is provided a processing liquid application device including: a spray nozzle configured to discharge a processing liquid for forming a lower base layer or an upper layer of an ink discharged onto a printing medium by an ink jet printer; a platen support portion disposed at a position facing the spray nozzle in a discharge direction of the processing liquid from the spray nozzle and configured to support a platen on which the printing medium is placed; and a restriction member disposed between the spray nozzle and the platen and configured to restrict an application range of the processing liquid discharged from the spray nozzle.

10 Claims, 13 Drawing Sheets

PROCESSING LIQUID APPLICATION DEVICE

REFERENCE TO RELATED APPLICATIONS

This application claims priority from Japanese Patent Application No. 2023-055447 filed on Mar. 30, 2023. The entire content of the priority application is incorporated herein by reference.

BACKGROUND ART

A related-art textile printing apparatus includes a pretreatment agent application unit for applying, to a textile-printing medium as a printing medium, a pretreatment agent for fixing a printing liquid. The pretreatment agent application unit of the textile printing apparatus is connected to a tank where the pretreatment agent is stored via a flow path, and the pretreatment agent is supplied from the tank. When printing an image on the textile-printing medium, the textile printing apparatus applies the pretreatment agent to the textile-printing medium, which is conveyed by a tray (or a platen) of a conveyance device, by using the pretreatment agent application unit, and then discharges the printing liquid onto a lower base layer formed by using the pretreatment agent. In this manner, the image is printed on the textile-printing medium.

SUMMARY

The inventor of the present disclosure has considered that a spray nozzle for discharging the processing liquid as the pretreatment agent and applying the processing liquid onto the printing medium is adopted as the pretreatment agent application unit. The processing liquid discharged from the spray nozzle spreads in a fan shape toward a discharge direction from the spray nozzle. Therefore, the processing liquid is likely to flow to the outside of the platen supporting the printing medium or to the outside of the printing medium supported by the platen. As a result, there is a problem that the processing liquid adheres to a device supporting the platen and an installation surface on which the device is installed, and contaminates the device and the installation surface.

Accordingly, an object of the present disclosure is to provide a processing liquid application device that is capable of restraining a processing liquid from adhering to a device supporting a platen and an installation surface on which the device is installed, and from contaminating the device and the installation surface.

A processing liquid application device according to the present disclosure includes: a spray nozzle configured to discharge a processing liquid for forming a lower base layer or an upper base layer of an ink discharged onto a printing medium by an ink jet printer; a platen support portion disposed at a position facing the spray nozzle in a discharge direction of the processing liquid from the spray nozzle and configured to support a platen on which the printing medium is placed; and a restriction member disposed between the spray nozzle and the platen and configured to restrict an application range of the processing liquid discharged from the spray nozzle.

A processing liquid application device according to the present disclosure and having another aspect includes: a spray nozzle configured to discharge a processing liquid for forming a lower base layer or an upper base layer of an ink discharged onto a printing medium by an ink jet printer; a platen support portion disposed at a position facing the spray nozzle in a discharge direction of the processing liquid from the spray nozzle and configured to support a platen on which the printing medium is placed; and a restriction member configured to restrict an application range of the processing liquid discharged from the spray nozzle, wherein the platen support portion is located at a position where the restriction member is disposed between the spray nozzle and the platen in the discharge direction.

The processing liquid discharged from the spray nozzle spreads in a fan shape. The discharge direction is any one of all directions in which the processing liquid spreads in the fan shape from the spray nozzle.

According to the processing liquid application device of the present disclosure, the application range of the processing liquid can be restricted by the restriction member. Therefore, it is possible to restrain the processing liquid from adhering to a device supporting the platen and an installation surface on which the device is installed, and from contaminating the device and the installation surface.

DESCRIPTION

A printing apparatus 1 including a processing liquid application device according to the present disclosure will be described with reference to the drawings. In the following description, an up-down direction and a front-rear direction are defined based on a state where the printing apparatus 1 is installed in a usable manner (the state of FIG. 1), and a left-right direction is defined when the printing apparatus 1 is seen from the front. In the following description, the left-right direction may be referred to as a main scanning direction, and the front-rear direction may be referred to as a sub scanning direction.

Figure 1:
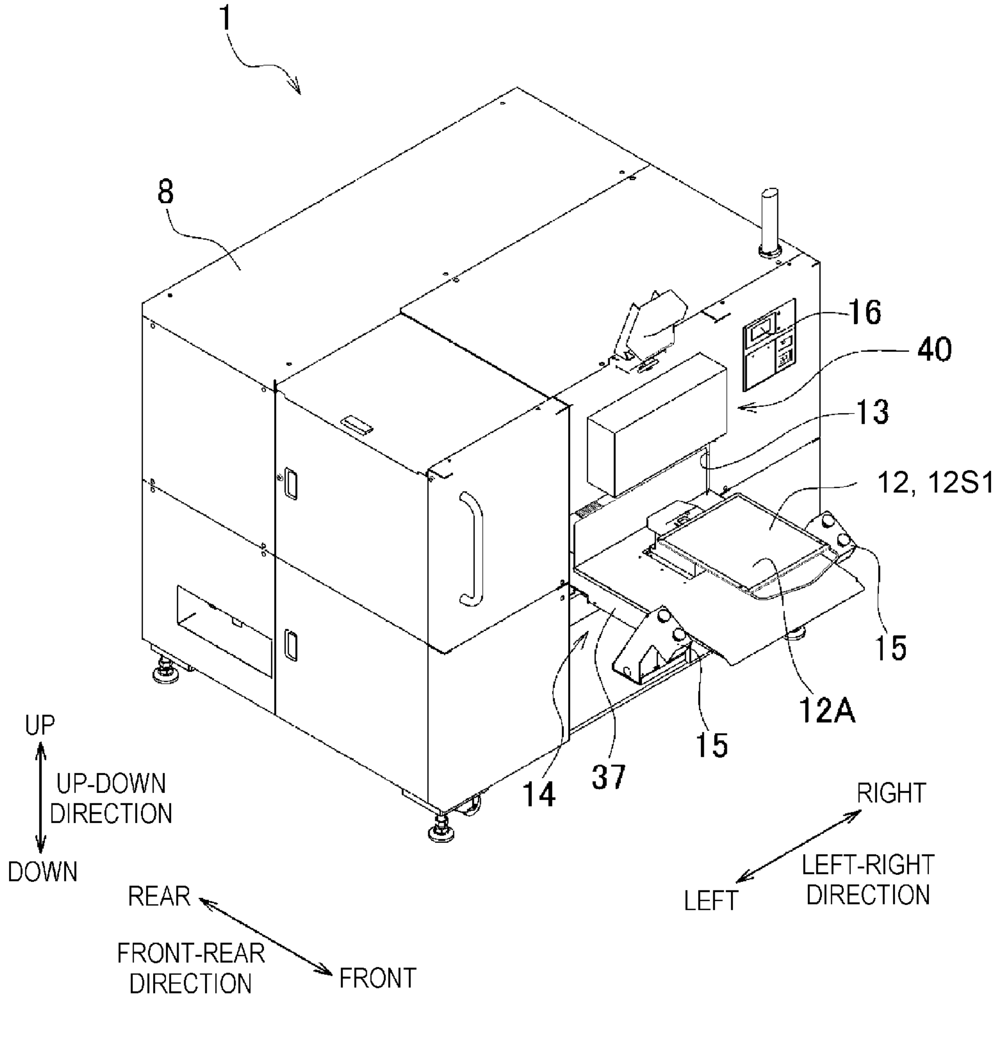
FIG. 1 is a schematic perspective view of a printing apparatus including a processing liquid application device according to an embodiment of the present disclosure.

The printing apparatus 1 illustrated in FIG. 1 includes an ink jet printer that discharges an ink onto a printing medium and performs printing. The printing apparatus 1 can print a color image on the printing medium by using inks of five colors including white, black, yellow, cyan, and magenta. The printing medium is not particularly limited as long as an image can be formed thereon by discharging an ink, and examples thereof include fabric and paper. In the present embodiment, the printing medium is, for example, a T-shirt containing polyester fibers. When the printing apparatus 1 performs the printing on the printing medium (the T-shirt), a processing liquid for forming a lower base layer onto which the inks are discharged is applied to the printing medium. The processing liquid reacts with the inks discharged onto the lower base layer to aggregate components of the inks, thereby preventing the occurrence of bleeding. A volatile component of the processing liquid includes an organic acid such as a formic acid.

Hereinafter, the ink of white among the inks of the five colors is referred to as the "white ink". When the inks of the four colors including black, cyan, yellow, and magenta among the inks of the five colors are collectively referred to, or when none of the inks of the four colors is specified, the inks are referred to as the "color ink". When the white ink and the color ink are collectively referred to, or when either of the inks is not specified, the white ink and the color ink are simply referred to as the "ink". The white ink is used for the printing as a part representing the white of the image, or as a base of the color ink. The color ink is discharged onto the base formed by using the white ink and is used for the printing of the color image.

An appearance configuration of the printing apparatus 1 will be described with reference to FIGS. 1 and 2. As illustrated in FIG. 1, the printing apparatus 1 includes a housing 8, a platen 12, a conveyance mechanism 14, operation units 15, a display screen 16, a processing liquid discharge unit 40, and a controller 80. The platen 12, the conveyance mechanism 14, the operation units 15, the processing liquid discharge unit 40, and the controller 80 correspond to the "processing liquid application device" according to the present disclosure. In addition, an ink jet printer portion is constituted by the components excluding the processing liquid discharge unit 40 of the printing apparatus 1.

As illustrated in FIG. 1, the housing 8 has a substantially rectangular parallelepiped shape, and a rectangular-shaped platen opening 13 is formed at a substantial center of a front surface in the left-right direction and the up-down direction. Five cartridges (not shown) in which the inks of the five colors are respectively accommodated are stored in the housing 8. As illustrated in FIG. 2, the platen 12 is implemented by a plate-shaped member having a substantially rectangular planar shape. An upper surface of the platen 12 is a support surface 12A that supports the printing medium. The support surface 12A has a square shape.

The operation units 15 are respectively provided at both left and right end portions of a platen support portion 37 (to be described later) protruding forward from the platen opening 13. The operation units 15 output information corresponding to an operation performed by a user to the controller 80 to be described later. The user can input a printing start command (including printing data) for starting printing by the printing apparatus 1, and the like to the controller 80 by operating the operation units 15. The printing data also includes image range data indicating a range of the image to be formed on the printing medium. The display screen 16 is provided on an upper portion on a right side of the platen opening 13 in the front surface of the housing 8. The display screen 16 displays various kinds of information.

The conveyance mechanism 14 conveys the platen 12, on which the printing medium is disposed, between the inside and the outside of the housing 8 through the platen opening 13. When the platen 12 is disposed in a processing liquid discharge region P4, the processing liquid is discharged from the processing liquid discharge unit 40, and the processing liquid is applied to the printing medium. Further, when the platen 12 is disposed in a printing conveyance region P3 (a position indicated by a two-dot chain line in FIG. 2) inside the housing 8 illustrated in FIG. 2, the ink is discharged from heads 30 to be described later, and the printing is performed. As illustrated in FIG. 2, the conveyance mechanism 14 includes the platen support portion 37, a pair of right and left rails 38, a transmission member 39, and a sub scanning motor 26 (see FIG. 4).

Figure 2:
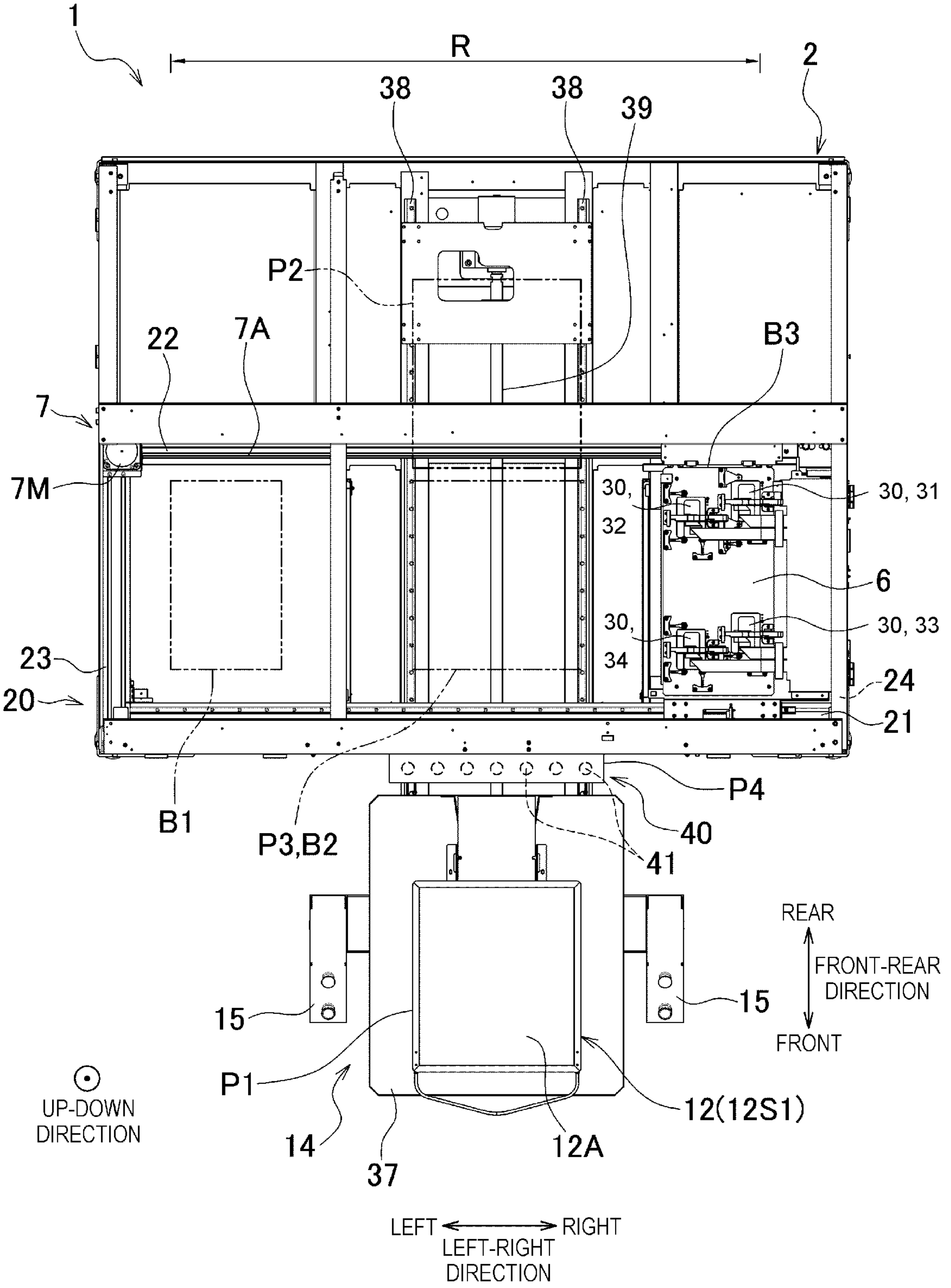
FIG. 2 is a plan view illustrating an internal structure of the printing apparatus illustrated in FIG. 1.

As illustrated in FIGS. 1 and 2, the platen support portion 37 is disposed at a position facing the processing liquid discharge unit 40 along the up-down direction. More specifically, the platen support portion 37 is disposed at a position facing spray nozzles 41 included in the processing liquid discharge unit 40, which are described later, in a discharge direction of the processing liquid from the spray nozzles 41. The platen support portion 37 supports the platen 12 from below.

Figure 9:
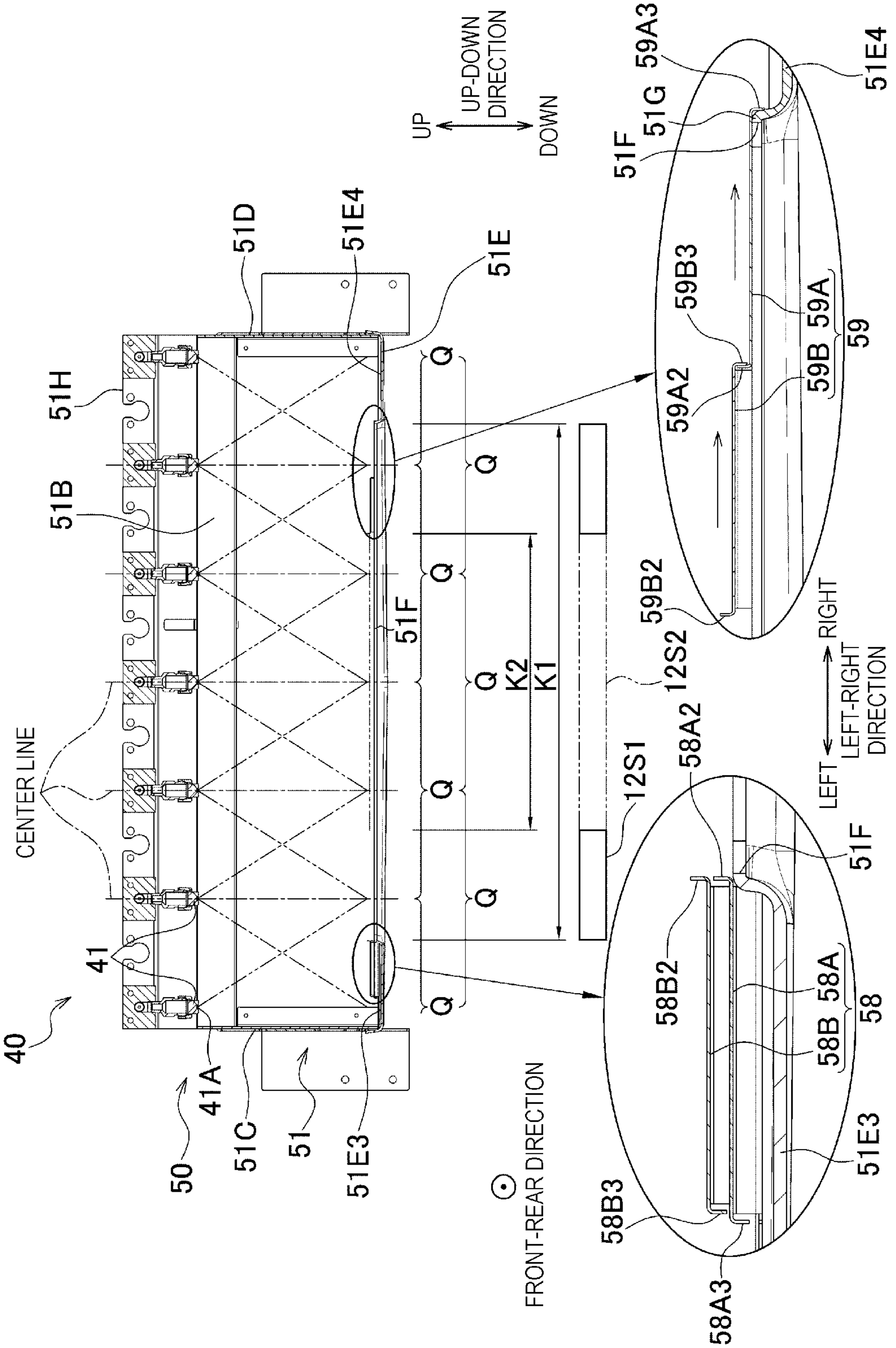
FIG. 9 is a cross-sectional view taken along a line IX-IX illustrated in FIG. 3.
Figure 10A:
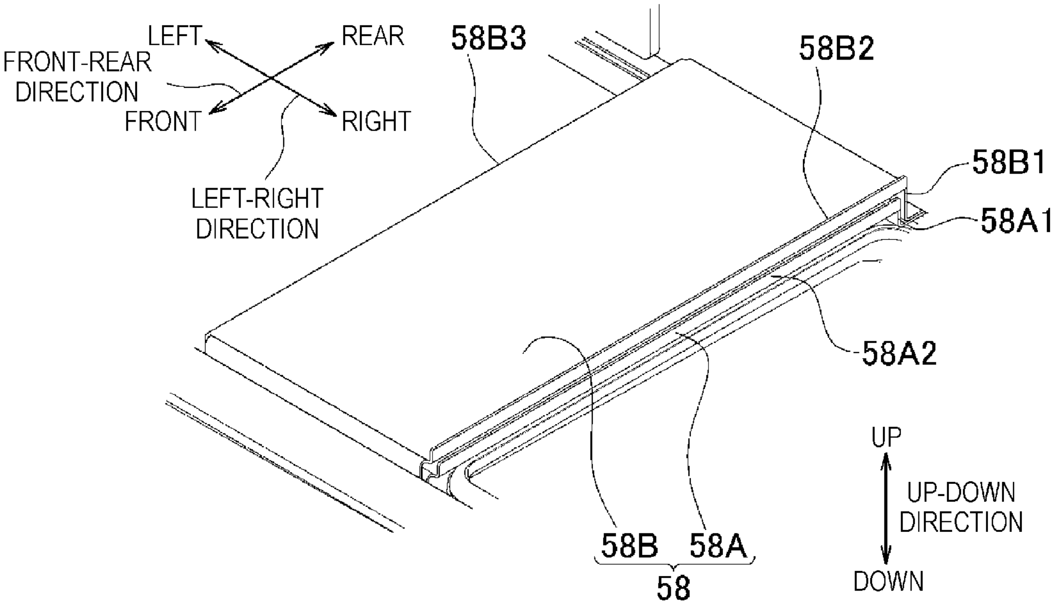
FIG. 10A is an enlarged view of an XA portion illustrated in FIG. 5.
Figure 10B:
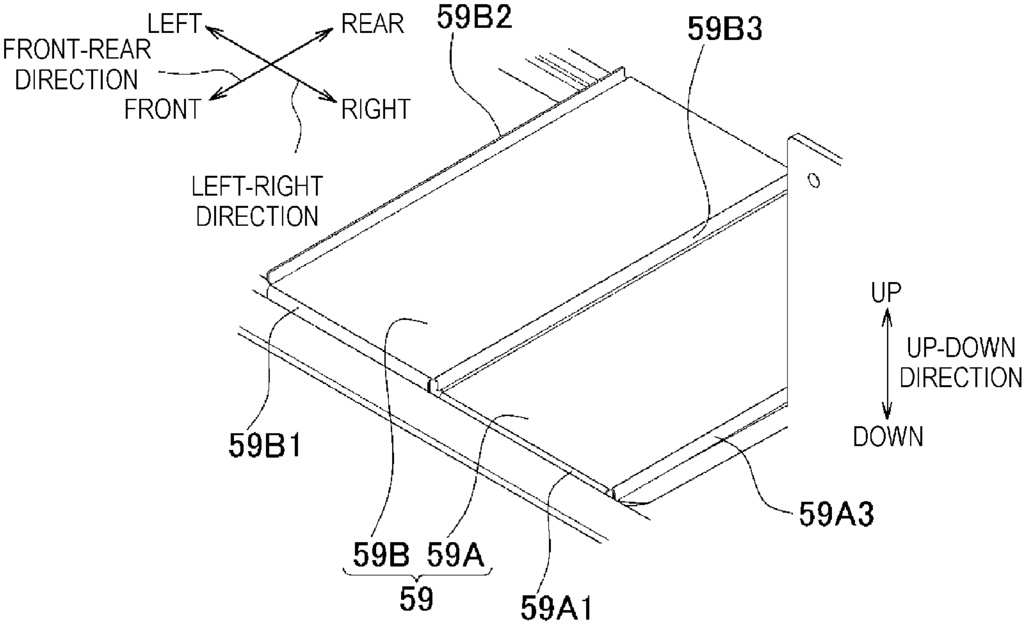
FIG. 10B is an enlarged view of an XB portion illustrated in FIG. 5.

The platen support portion 37 is capable of supporting a first platen 12S1 and a second platen 12S2 illustrated in FIG. 9 as the platen 12. In FIGS. 1 and 2, a state where the platen support portion 37 supports the first platen 12S1 is illustrated, and the first platen 12S1 may be removed from the platen support portion 37 and the second platen 12S2 may be attached to the platen support portion 37. That is, the first platen 12S1 and the second platen 12S2 are attached to the platen support portion 37 in a replaceable manner.

The first platen 12S1 has a larger width in the left-right direction (a "width direction" according to the present disclosure) than that of the second platen 12S2. More specifically, the width (a "first width" according to the present disclosure) of the first platen 12S1 in the left-right direction is about an opening width of a through hole 51F to be described later in the left-right direction, and is about a width between inner ends of two expansion members 58 and 59 to be described later when the two expansion members 58 and 59 are disposed at the first expansion position. In other words, the first expansion position according to the present embodiment corresponds to the width of the first platen 12S1. On the other hand, the width (a "second width" according to the present disclosure) of the second platen 12S2 in the left-right direction is about a width between the inner ends of the two expansion members 58 and 59 when the two expansion members 58 and 59 are disposed at the second expansion position. In other words, the second expansion position according to the present embodiment corresponds to the width of the second platen 12S2. The first platen 12S1 and the second platen 12S2 have the same flat plate shape except for sizes. In addition, when the first platen 12S1 and the second platen 12S2 are collectively referred to or when either of the first platen 12S1 and the second platen 12S2 is not specified, the first platen 12S1 and the second platen 12S2 are referred to as the "platen 12".

As illustrated in FIG. 2, the pair of left and right rails 38 extend in the front-rear direction and support the platen support portion 37 so as to be movable in the front-rear direction. The transmission member 39 is coupled to the platen support portion 37 and the sub scanning motor 26, and moves the platen support portion 37 in the front-rear direction, that is, the sub scanning direction, in response to driving of the sub scanning motor 26.

The user places the printing medium on the support surface 12A of the platen 12 when the platen 12 is disposed in front of the front surface of the housing 8, that is, outside the housing 8. The position of the platen 12 illustrated in FIG. 2 is a setting position P1 at which the printing medium is supported by the platen 12. The processing liquid discharge region P4 is a region that is present in the middle of a conveyance path of the platen 12 and where the processing liquid is discharged from the spray nozzles 41 of the processing liquid discharge unit 40, and is present below the spray nozzles 41 (that is, in the discharge direction of the processing liquid). Before printing on the printing medium, the platen 12 moves from the setting position P1 to a pre-printing standby position P2 (a position indicated by a two-dot chain line in FIG. 2). The pre-printing standby position P2 is located behind the processing liquid discharge region P4 and the printing conveyance region P3, and is located at a rear end portion of the conveyance path of the platen 12. The printing conveyance region P3 is a region that overlaps a movement path of the heads 30 to be described later in the main scanning direction (the left-right direction) in the up-down direction in the conveyance path of the platen 12. The movement path of the heads 30 in the main scanning direction is a path between a rear end of the rearmost head 30 (a white ink head 31) and a front end of the foremost head 30 (a color ink head 34).

An internal structure of the printing apparatus 1 will be described. As illustrated in FIG. 2, the printing apparatus 1 includes a frame 2, the heads 31 to 34, and a moving mechanism 7 inside the housing 8. The frame 2 is configured in a grid shape by a plurality of shafts extending in the front-rear direction, the left-right direction, and the up-down direction. The moving mechanism 7 includes a guide shaft 20 fixed to the frame 2 and a carriage 6. As illustrated in FIG. 2, the guide shaft 20 includes a front shaft 21, a rear shaft 22, a left shaft 23, and a right shaft 24. The heads 31 to 34 are collectively referred to as "heads 30" or simply "head 30" in singular when referring to one of the heads 31 to 34 in the present disclosure.

As illustrated in FIG. 2, the front shaft 21 is disposed at a front end portion of the frame 2 and extends in the left-right direction from a left end portion to a right end portion of the frame 2. The rear shaft 22 is disposed at a substantial center of the frame 2 in the front-rear direction, and extends in the left-right direction from the left end portion to the right end portion of the frame 2. The left shaft 23 is disposed at the left end portion of the frame 2, and extends in the front-rear direction from a left end of the front shaft 21 to a left end of the rear shaft 22. The right shaft 24 is disposed at the right end portion of the frame 2, and extends in the front-rear direction from a right end of the front shaft 21 to a right end of the rear shaft 22. The front shaft 21 and the rear shaft 22 support the carriage 6. The conveyance mechanism 14 is fixed to the frame 2.

As illustrated in FIG. 2, the carriage 6 is supported by the front shaft 21 and the rear shaft 22 so as to be movable in the main scanning direction. The carriage 6 has a plate shape and extends in the front-rear direction and the left-right direction. The carriage 6 extends from the front shaft 21 to the rear shaft 22. As illustrated in FIG. 2, the carriage 6 is provided with the white ink heads 31 and 32 and the color ink heads 33 and 34.

The white ink heads 31 and 32 and the color ink heads 33 and 34 have the same structure, and have a rectangular parallelepiped shape in the present embodiment. Hereinafter, when the white ink heads 31 and 32 and the color ink heads 33 and 34 are collectively referred to, or when neither the white heads 31 and 32 nor the color heads 33 and 34 are specified, the white heads 31 and 32 and the color heads 33 and 34 are referred to as the "heads 30". As illustrated in FIG. 2, the white ink heads 31 and 32 are located at a rear portion of the carriage 6. The white ink head 31 is located at a right rear portion of the carriage 6. The white ink head 32 is located on a left side of the white ink head 31 and is displaced forward with respect to the white ink head 31. A rear portion of the white ink head 32 overlaps a front portion of the white ink head 31 in the left-right direction.

As illustrated in FIG. 2, the color ink heads 33 and 34 are located in front of the white ink heads 31 and 32. The color ink heads 33 and 34 are located at the same positions as the white ink heads 31 and 32 in the left-right direction, respectively. That is, the white ink heads 31 and 32 and the color ink heads 33 and 34 are arranged side by side along the sub scanning direction. The color ink head 34 is located on a left side of the color ink head 33 and is displaced forward with respect to the color ink head 33. A rear portion of the color ink head 34 overlaps a front portion of the color ink head 33 in the left-right direction.

A plurality of nozzles (not shown) are formed on lower surfaces of these heads 30. The nozzles of the white ink heads 31 and 32 discharge the white ink downward. The nozzles of each of the color ink heads 33 and 34 are disposed such that four nozzle rows each extending in the front-rear direction are arranged in the left-right direction. The color ink of different colors correspond to the four nozzle rows of each of the color ink heads 33 and 34, respectively. That is, the nozzles of each of the color ink heads 33 and 34 discharge the color ink of the colors respectively corresponding to the nozzle rows downward.

The moving mechanism 7 includes a driving belt 7A and a main scanning motor 7M. The driving belt 7A is coupled to a rear end portion of the carriage 6. The driving belt 7A is provided on the rear shaft 22 and extends in the left-right direction. A left end portion of the driving belt 7A is coupled to the main scanning motor 7M. When the main scanning motor 7M is driven, the driving belt 7A moves the carriage 6 in the left-right direction along the front shaft 21 and the rear shaft 22. That is, the moving mechanism 7 moves the carriage 6 on which the heads 30 are mounted in the main scanning direction. FIG. 2 illustrates a state where the carriage 6 is located on a right side of a movement range R.

In FIG. 2, the movement range R of the heads 30 is illustrated as a maximum range in which the carriage 6 can move in the main scanning direction. The heads 30 are mainly disposed at any one of a maintenance position B1, a discharge region B2, and a head standby position B3 by the moving mechanism 7. The maintenance position B1 is at a left end of the movement range R of the heads 30, and is a position where the heads 30 are maintained by a maintenance unit such as a wiper (not shown) or a cap (not shown). The printing apparatus 1 moves the heads 30 to the maintenance position B1 during non-printing, and performs the maintenance by the maintenance unit. The discharge region B2 is a region that is located between the maintenance position B1 and the head standby position B3 in the main scanning direction, and overlaps the conveyance path (the printing conveyance region P3) of the platen 12 in the up-down direction in the movement path of the heads 30. When the heads 30 passes through the discharge region B2 by the carriage 6, the heads 30 discharge the ink according to the printing data, and the printing is performed on the printing medium on the platen 12. The head standby position B3 is at a right end of the movement range R of the heads 30, and is a position where an operator performs an operation such as cleaning the heads 30. For example, the printing apparatus 1 moves the heads 30 to the head standby position B3 and causes the heads 30 to stand by based on an instruction input from the operation units 15 by a user operation.

The printing apparatus 1 moves the platen 12 in the sub scanning direction by the driving of the sub scanning motor 26 in the printing conveyance region P3 and moves the carriage 6 in the main scanning direction by the driving of the main scanning motor 7M in the discharge region B2, and thus the printing medium moves relative to the heads 30 in the sub scanning direction and the main scanning direction.

An operation of moving the heads 30 in the main scanning direction and discharging the ink onto the printing medium when the heads 30 face the printing medium is referred to as "discharge scanning". The printing apparatus 1 performs the printing on the printing medium by repeating the discharge scanning and the movement of the platen 12 in the sub scanning direction. For example, the printing apparatus 1 discharges the white ink from the white ink heads 31 and 32 to form the base of the color ink on the printing medium in the discharge scanning. The printing apparatus 1 prints the color image by discharging the color ink from the color ink heads 33 and 34 onto the base formed on the printing medium in the discharge scanning.

Figure 3:
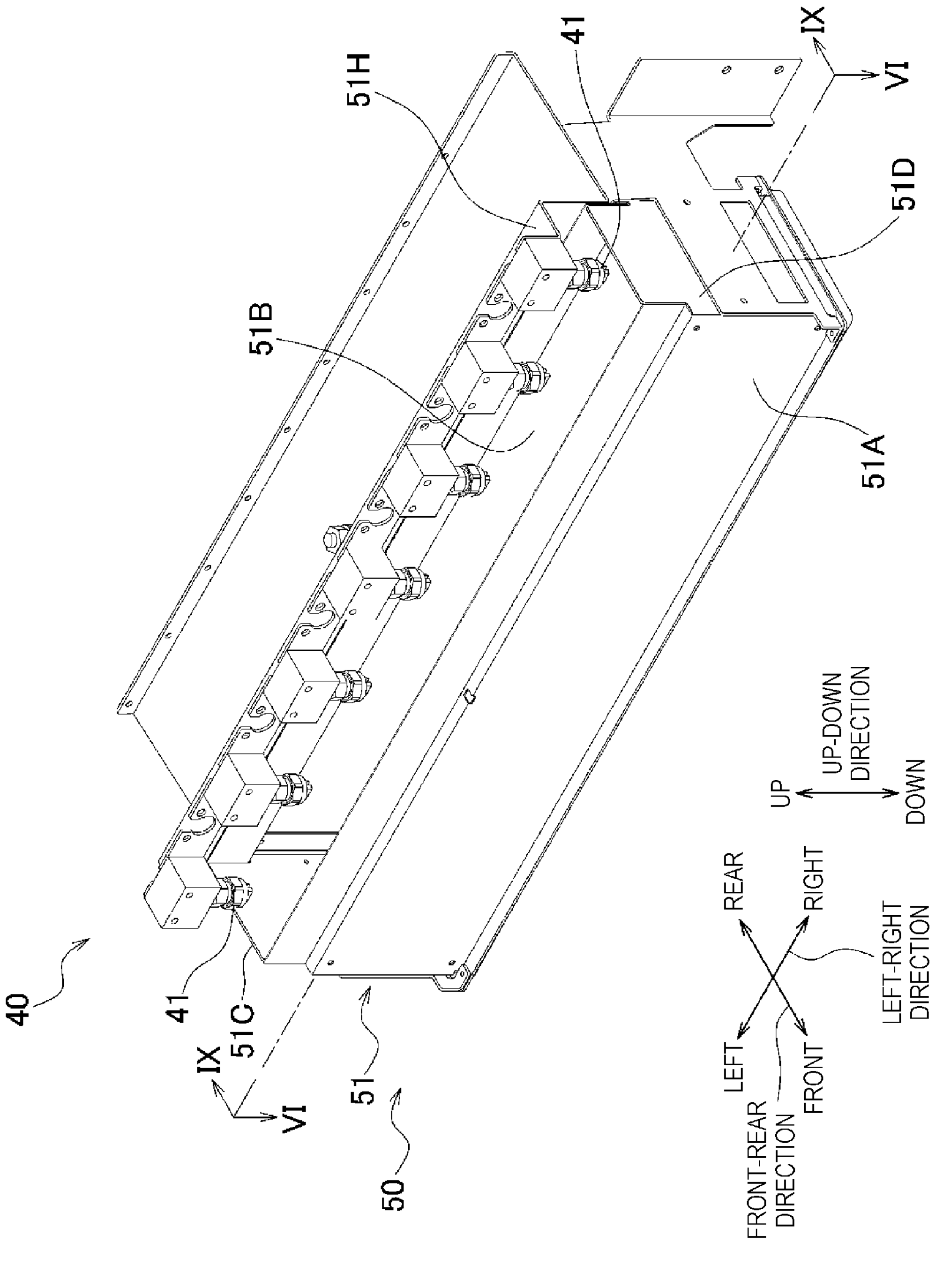
FIG. 3 is a perspective view of a processing liquid discharge unit illustrated in FIG. 1.
Figure 4:
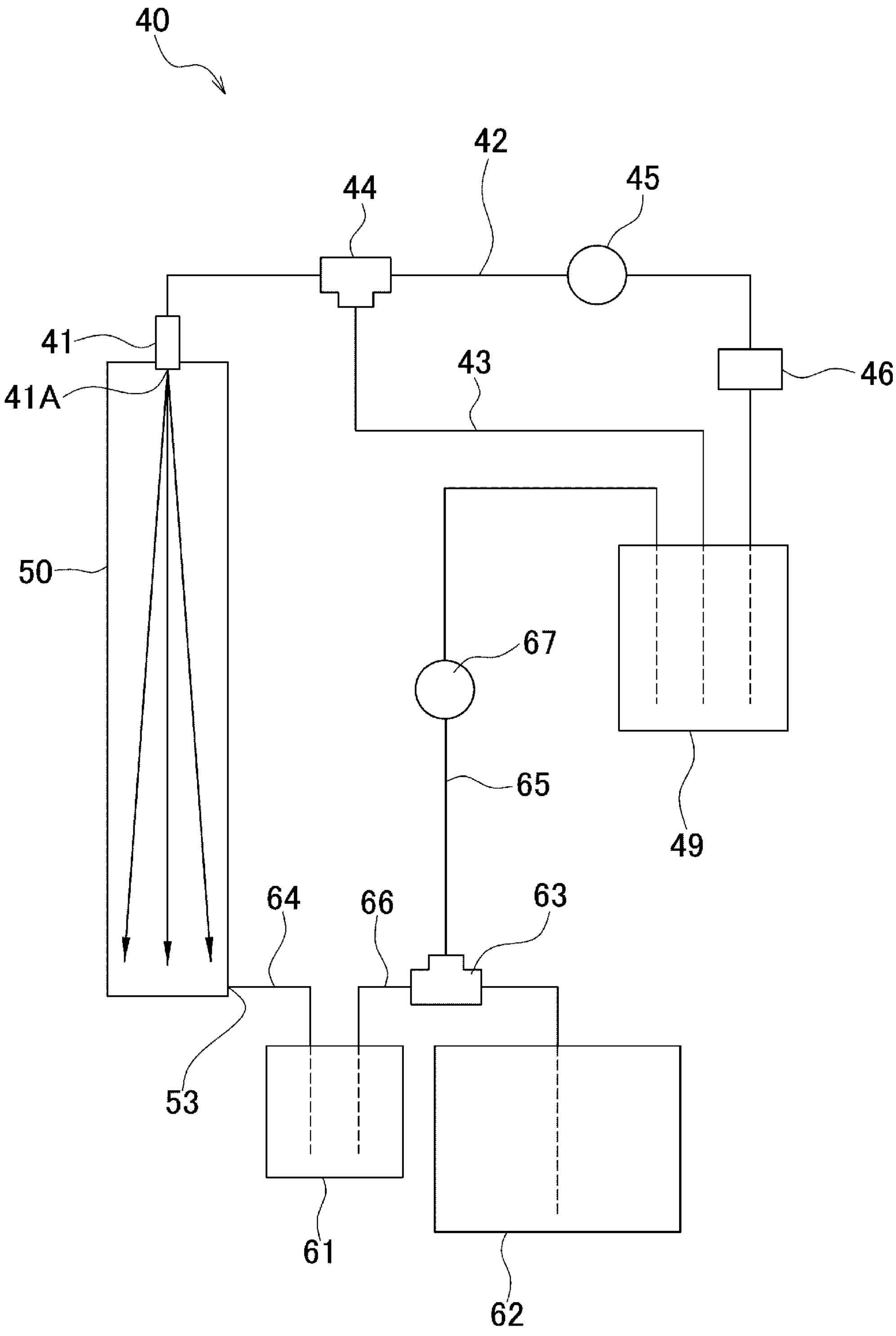
FIG. 4 is a schematic view of the processing liquid discharge unit illustrated in FIG. 1.

As illustrated in FIG. 3, the processing liquid discharge unit 40 includes seven spray nozzles 41 arranged side by side in the left-right direction. In addition, as illustrated in FIG. 4, the processing liquid discharge unit 40 includes a sub tank 49 that accommodates the processing liquid, and a supply pipe 42, a circulation pipe 43, a valve 44, a pump 45, and a filter 46 that are provided for each spray nozzle 41. That is, the processing liquid discharge unit 40 includes the supply pipes 42, the circulation pipes 43, the valves 44, the pumps 45, and the filters 46 that have the same number as the spray nozzles 41. FIG. 4 illustrates the supply pipe 42, the circulation pipe 43, the valve 44, the pump 45, and the filter 46 provided for one spray nozzle 41.

Since configurations of the supply pipe 42, the circulation pipe 43, the valve 44, and the pump 45 for the respective spray nozzles 41 are the same, a configuration corresponding to one spray nozzle 41 will be described. The spray nozzle 41 is connected to the supply pipe 42, and has a discharge port 41A on a lower surface of the spray nozzle 41. Further, the spray nozzle 41 is capable of discharging the processing liquid in the form of mist downward from the discharge port 41A.

The supply pipe 42 has one end connected to the spray nozzle 41 and the other end connected to the sub tank 49. The supply pipe 42 supplies the processing liquid in the sub tank 49 to the spray nozzle 41.

The pump 45 is provided at a middle portion of the supply pipe 42, and is driven by the controller 80 to supply the processing liquid in the sub tank 49 to a spray nozzle 41 side. The filter 46 filters an impurity from the processing liquid, and is provided in the supply pipe 42 between the pump 45 and the sub tank 49. Since the filter 46 is provided in the supply pipe 42, the impurity can be filtered from the processing liquid flowing in the supply pipe 42 from the sub tank 49 to the pump 45.

The valve 44 is provided in the supply pipe 42 between the spray nozzle 41 and the pump 45. The valve 44 according to the present embodiment is a three-way valve that operates under the control of the controller 80, and is also connected to one end of the circulation pipe 43. Accordingly, the valve 44 can be selectively set to a first state or a second state, in the first state, a communication state where the circulation pipe 43 and the supply pipe 42 are communicated is set while a cut-off state where the communication between the pump 45 and the spray nozzle 41 is cut off is set, and in the second state, a cut-off state where the communication between the circulation pipe 43 and the supply pipe 42 is cut off is set while a communication state where the pump 45 and the spray nozzle 41 are communicated is set.

The circulation pipe 43 has one end connected to the valve 44 and the other end connected to the sub tank 49. Accordingly, the circulation pipe 43 can circulate the processing liquid from the supply pipe 42 to the sub tank 49 when the valve 44 is set to the first state.

In such a configuration, when the controller 80 drives the pump 45 and sets the valve 44 to the first state, the processing liquid from the sub tank 49 can flow from the supply pipe 42 to the circulation pipe 43 and can circulate to the sub tank 49. In addition, when the controller 80 drives the pump 45 and sets the valve 44 to the second state, the processing liquid from the sub tank 49 can be supplied to the spray nozzle 41. The processing liquid supplied to the spray nozzle 41 spreads in a fan shape from the spray nozzle 41 and is discharged in the form of mist. Accordingly, the processing liquid can be applied to the printing medium.

As illustrated in FIGS. 3 and 4, the processing liquid discharge unit 40 further includes a restriction member 50, a moving mechanism 70 (see FIG. 11), a recovery tank 61, a main tank 62, a valve 63, a recovery pipe 64, a first replenishment pipe 65, a second replenishment pipe 66, and a pump 67. The recovery pipe 64 has one end connected to a discharge port 53 (to be described later) of the restriction member 50 and the other end connected to the recovery tank 61, and causes the processing liquid received by the restriction member 50 to flow to the recovery tank 61. One end portion of the recovery pipe 64 connected to the discharge port 53 is disposed at the uppermost position, and the other portion thereof is disposed below the one end portion. An internal flow path of the recovery pipe 64 corresponds to a "recovery flow path" according to the present disclosure. The recovery tank 61 (a "tank" according to the present disclosure) is disposed below the discharge port 53 and stores the processing liquid flowing through the recovery pipe 64.

The main tank 62 has a larger volume than the sub tank 49 and stores a larger amount of the processing liquid. The first replenishment pipe 65 has one end connected to the main tank 62 and the other end connected to the sub tank 49, and causes the processing liquid in the main tank 62 to flow to the sub tank 49.

The pump 67 is provided at a middle portion of the first replenishment pipe 65 and is driven by the controller 80 to supply the processing liquid in the main tank 62 or the recovery tank 61 to the sub tank 49. The valve 63 is provided in the first replenishment pipe 65 between the main tank 62 and the pump 67. Similar to the valve 44 described above, the valve 63 is a three-way valve that operates under the control of the controller 80, and is also connected to one end of the second replenishment pipe 66. Accordingly, the valve

63 can be selectively set to a first replenishment state or a second replenishment state, in the first replenishment state, a cut-off state where the communication between the second replenishment pipe 66 and the first replenishment pipe 65 is cut off is set while a communication state where the pump 67 and the main tank 62 are communicated is set, and in the second replenishment state, a communication state where the second replenishment pipe 66 and the first replenishment pipe 65 are communicated is set while a cut-off state where the communication between the pump 67 and the main tank 62 is cut off is set.

The second replenishment pipe 66 has one end connected to the valve 63 and the other end connected to the recovery tank 61. Accordingly, the second replenishment pipe 66 can cause the processing liquid from the recovery tank 61 to flow to the first replenishment pipe 65 when the valve 63 is set to the second replenishment state.

In such a configuration, when the controller 80 drives the pump 67 and sets the valve 63 to the first replenishment state, the processing liquid from the main tank 62 can be replenished to the sub tank 49. In addition, when the controller 80 drives the pump 67 and sets the valve 63 to the second replenishment state, the processing liquid from the recovery tank 61 can flow from the second replenishment pipe 66 to the first replenishment pipe 65 and can be replenished to the sub tank 49. That is, the processing liquid recovered in the recovery tank 61 can be reused.

Figure 5:
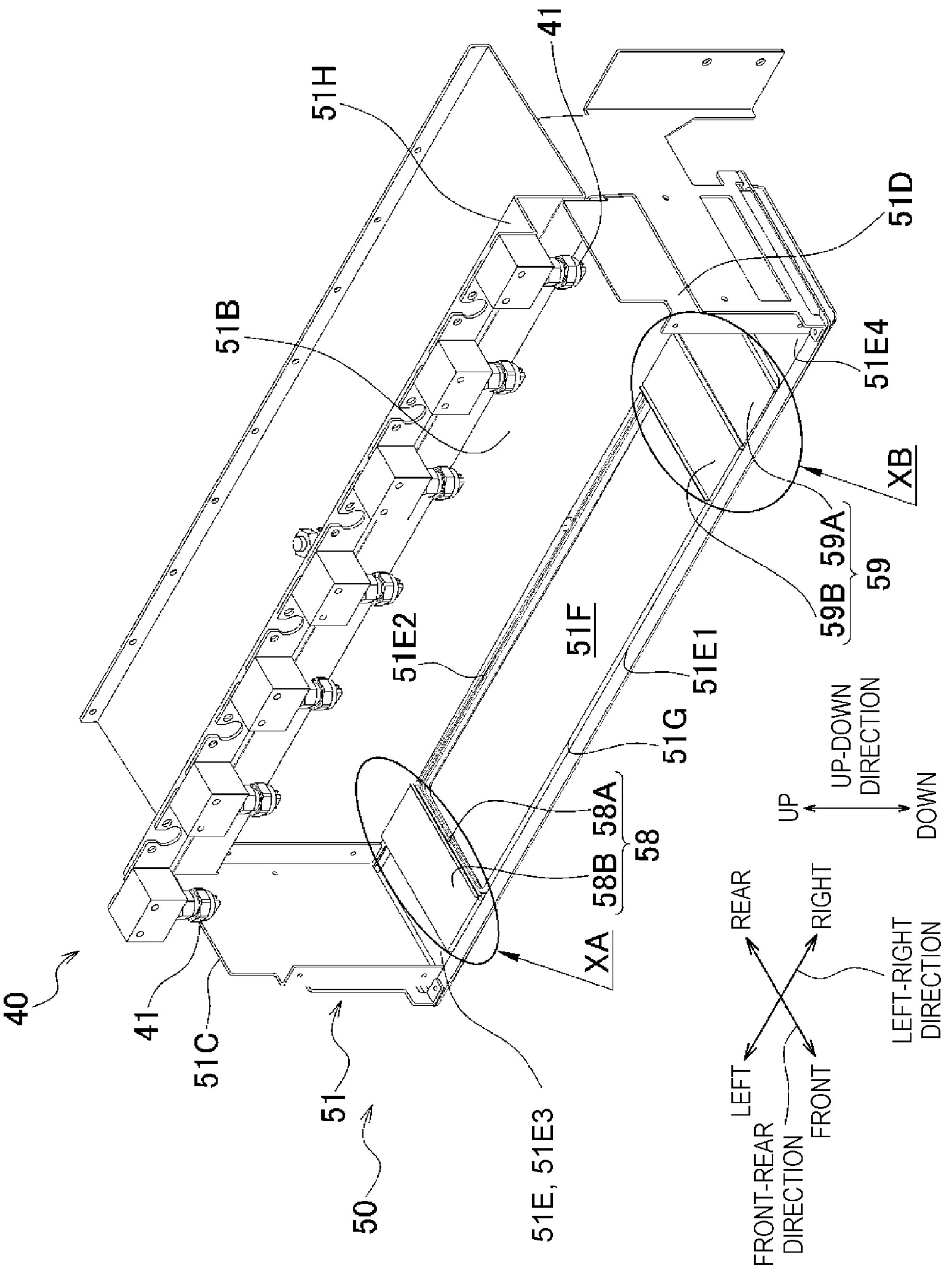
FIG. 5 is a perspective view of the processing liquid discharge unit in a state where a front plate of a tubular member illustrated in FIG. 3 is removed.

As illustrated in FIGS. 3 and 5, the restriction member 50 includes a tubular member 51 and the two expansion members 58 and 59. The tubular member 51 includes a front plate 51A, a rear plate 51B, a left plate 51C, a right plate 51D, and a bottom plate 51E. The tubular member 51 according to the present embodiment is a rectangular tube, and may be, for example, a cylindrical tube. Alternatively, the tubular member 51 may be a tubular member that has an elliptical or polygonal planar shape. The tubular member 51 is disposed between the spray nozzles 41 and the platen 12 in the up-down direction (see FIG. 9).

As illustrated in FIG. 3, the front plate 51A extends in the up-down direction and the left-right direction, and has an elongated shape in the left-right direction. As illustrated in FIGS. 3 and 5, the rear plate 51B is disposed separately from the front plate 51A while facing the front plate 51A in the front-rear direction. The rear plate 51B extends in the up-down direction and the left-right direction, and has an elongated shape in the left-right direction.

As illustrated in FIG. 5, the left plate 51C extends in the up-down direction and the front-rear direction, and has an elongated shape in the up-down direction. The right plate 51D is disposed separately from the left plate 51C while facing the left plate 51C in the left-right direction. The right plate 51D extends in the up-down direction and the front-rear direction, and has an elongated shape in the up-down direction. The bottom plate 51E extends in the front-rear direction and the left-right direction, and has an elongated shape in the left-right direction. The bottom plate 51E where the through hole 51F to be described later is formed is connected to a lower end of a tubular body formed by connecting these four plates 51A to 51D in the front-rear direction and the left-right direction, thereby forming the tubular member 51 that has upper and lower openings.

Figure 8:
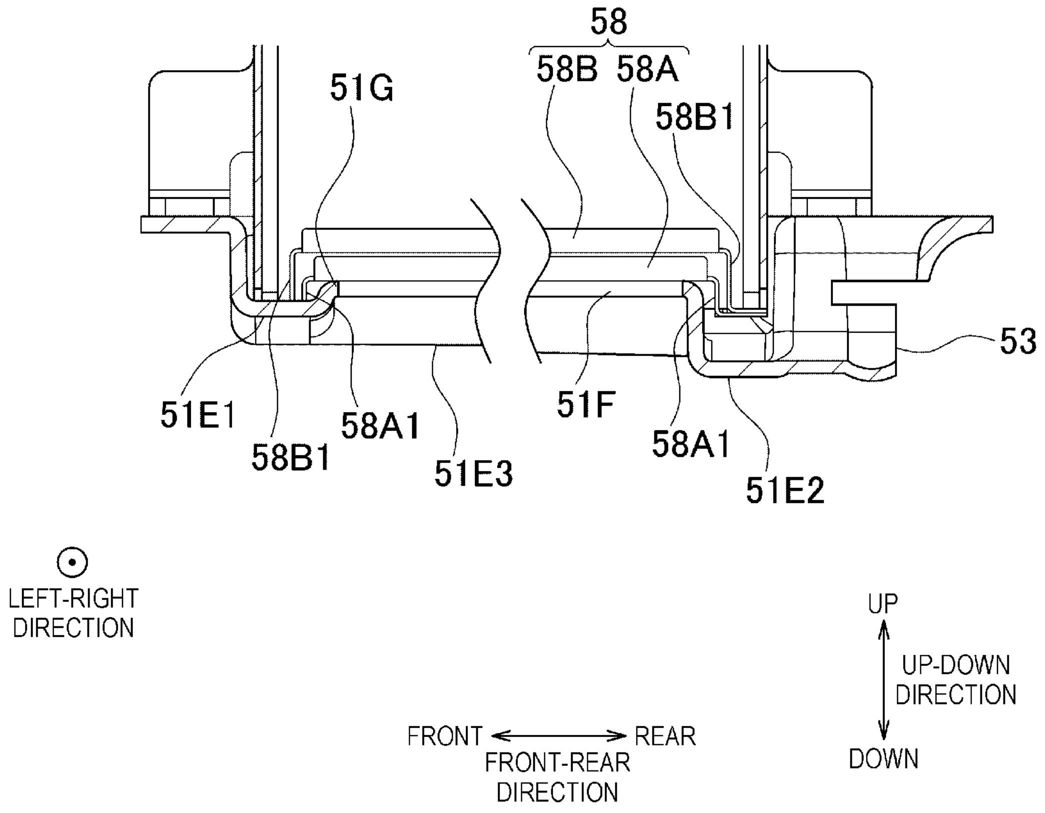
FIG. 8 is a cross-sectional view taken along a line VIII-VIII illustrated in FIG. 6.

As illustrated in FIG. 5, the through hole 51F penetrating in the up-down direction is formed in a central portion of the bottom plate 51E. The through hole 51F extends in the left-right direction to have an elongated shape, and is formed such that a front edge portion 51E1, a rear edge portion 51E2, a left edge portion 51E3, and a right edge portion 51E4 remain in the bottom plate 51E. As illustrated in FIG. 8, among the front edge portion 51E1, the rear edge portion 51E2, the left edge portion 51E3, and the right edge portion 51E4, the front edge portion 51E1 is located at the highest position in the up-down direction, and the rear edge portion 51E2 is located at the lowest position in the up-down direction. The left edge portion 51E3 and the right edge portion 51E4 are located at positions having the same height in the up-down direction, and are located between the front edge portion 51E1 and the rear edge portion 51E2. Further, an annular protrusion 51G protruding upward is formed at a peripheral edge portion of the through hole 51F of the bottom plate 51E.

Figure 6:
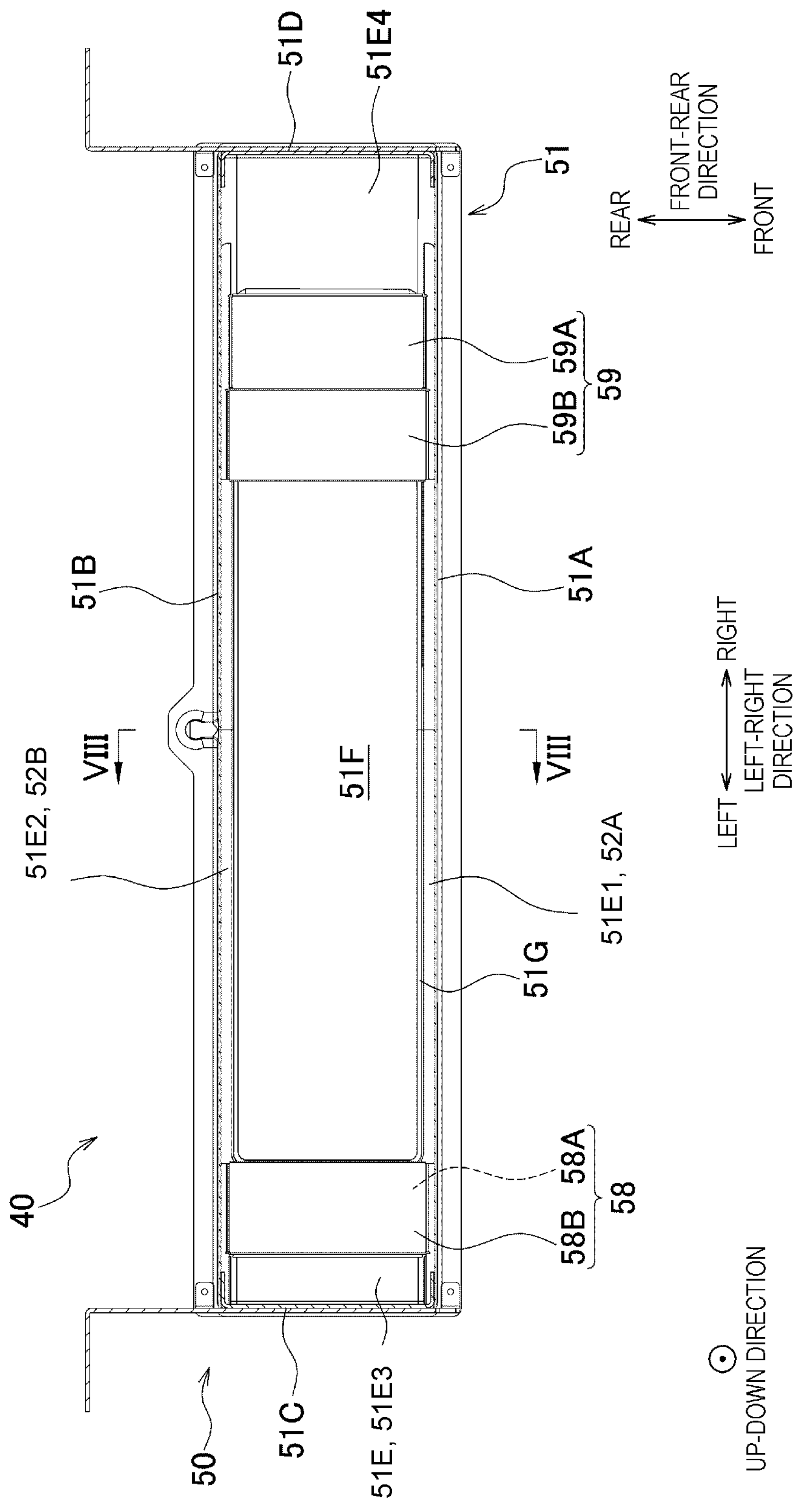
FIG. 6 is a cross-sectional view taken along a line VI-VI illustrated in FIG. 3.
Figure 7:
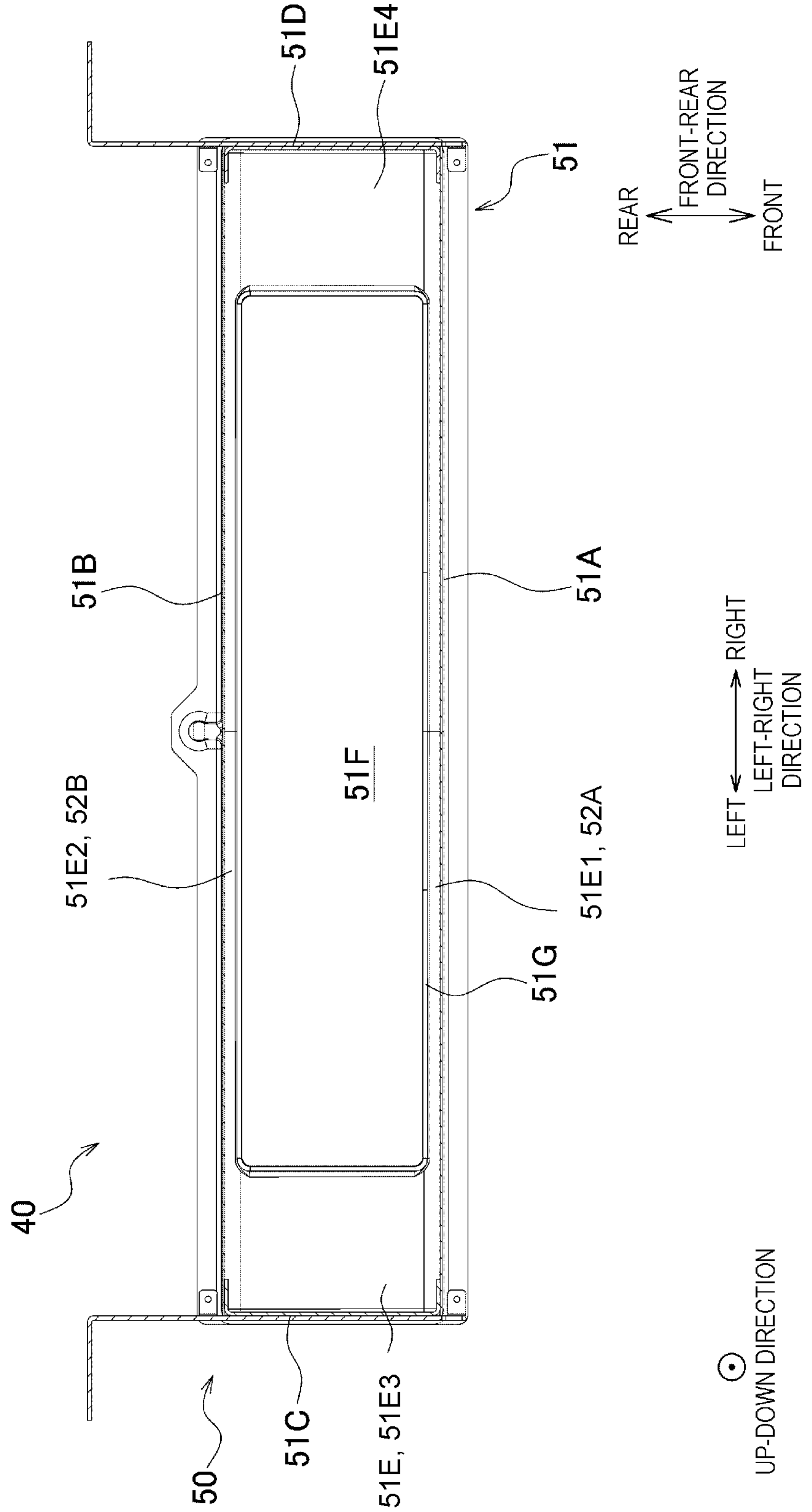
FIG. 7 is a cross-sectional view of a state where two expansion members are removed from FIG. 6.

As illustrated in FIGS. 6 and 7, the front edge portion 51E1 is a long plate-shaped portion that is located in front of the through hole 51F and extends in the left-right direction. A groove 52A extending in the left-right direction is formed at the front edge portion 51E1. A bottom portion of the groove 52A is inclined downward from a center toward both ends in the left-right direction. Further, left and right ends of the bottom portion of the groove 52A have the same height positions in the up-down direction as the left edge portion 51E3 and the right edge portion 51E4. Accordingly, the processing liquid received by the groove 52A flows toward both ends in the left-right direction. The processing liquid flowing from the groove 52A is received by the left edge portion 51E3 and the right edge portion 51E4. As described above, the front edge portion 51E1 constitutes a gutter that is located in front of the through hole 51F and causes the processing liquid to flow outward in the left-right direction.

As illustrated in FIGS. 6 and 7, the rear edge portion 51E2 is a long plate-shaped portion that is located behind the through hole 51F and extends in the left-right direction. A groove 52B extending in the left-right direction is formed at the rear edge portion 51E2. A bottom portion of the groove 52B is inclined downward from both ends toward a center in the left-right direction. Further, left and right ends of the bottom portion of the groove 52B have the same height positions in the up-down direction as the left edge portion 51E3 and the right edge portion 51E4. Accordingly, the processing liquid received by the left edge portion 51E3 and the right edge portion 51E4 flows into the groove 52B and flows toward the center of the groove 52B in the left-right direction. As described above, the rear edge portion 51E2 constitutes a gutter that is located behind the through hole 51F and causes the processing liquid to flow outward in the left-right direction toward the center.

The left edge portion 51E3 is a plate-shaped portion that is located leftward of the through hole 51F and extends in the front-rear direction and the left-right direction. The right edge portion 51E4 is a plate-shaped portion that is located rightward of the through hole 51F and extends in the front-rear direction and the left-right direction. The processing liquid received by the left edge portion 51E3 and the right edge portion 51E4 flows into the groove 52B. The left edge portion 51E3 and the right edge portion 51E4 directly receive the processing liquid from the spray nozzles 41. The left edge portion 51E3 and the right edge portion 51E4 receive the processing liquid flowing from the expansion members 58 and 59 and the groove 52A.

As illustrated in FIG. 8, the discharge port 53 is formed at a rear lower end of the tubular member 51, that is, a center in the left-right direction. The discharge port 53 communicates with the groove 52B. Accordingly, the processing liquid received by the bottom plate 51E flows to the discharge port 53 via the groove 52B and is recovered in the recovery tank 61 via the recovery pipe 64.

Here, the seven spray nozzles 41 will be described with reference to FIGS. 5 and 9. The seven spray nozzles 41 according to the present embodiment are supported by a support plate 51H fixed to an upper portion of the rear plate 51B of the tubular member 51. The seven spray nozzles 41 are arranged side by side at equal intervals along the left-right direction. Further, each of the seven spray nozzles 41 is disposed at a corresponding position where a center of the discharge port 41A overlaps a center line in the up-down direction, the center line passes through a center of the through hole 51F in the front-rear direction and extends in the left-right direction.

The seven spray nozzles 41 have the same configuration. As illustrated in FIG. 9, the spray nozzle 41 is configured such that the processing liquid discharged from the discharge port 41A spreads in the fan shape mainly in the left-right direction as the processing liquid flows downward from the discharge port 41A. Specifically, each of the spray nozzles 41 at least discharges the processing liquid to an entire discharge range Q in the left-right direction. The discharge range Q of each spray nozzle 41 is a range between the center lines passing through the centers of two spray nozzles 41 adjacent to one spray nozzle 41 on both left and right sides thereof. In addition, the discharge range Q is an approximate range in which the processing liquid discharged from the corresponding spray nozzle 41 spreads, and the processing liquid discharged from the corresponding spray nozzle 41 may exceed the discharge range Q.

As illustrated in FIG. 9, the seven spray nozzles 41 are arranged such that the discharge ranges Q of the adjacent spray nozzles 41 overlap each other in the left-right direction. As illustrated in FIG. 4, the processing liquid discharged from the discharge port 41A of the spray nozzle 41 also spreads in the front-rear direction as the processing liquid flows downward from the discharge port 41A.

In addition, as illustrated in FIG. 9, among the seven spray nozzles 41, two outermost spray nozzles 41, each located on the leftmost or rightmost side in the left-right direction are disposed at positions facing the left edge portion 51E3 and the right edge portion 51E4 in the up-down direction, respectively. The remaining five spray nozzles 41 are disposed at positions facing the through hole 51F in the up-down direction, respectively.

Of the two expansion members 58 and 59, the expansion member 58 is disposed at a position where the expansion member 58 can face the left edge portion 51E3 in the up-down direction, and can cover a left side portion of the through hole 51F by moving rightward from the position. The expansion member 59 is disposed at a position where the expansion member 59 can face the right edge portion 51E4 in the up-down direction, and can cover a right side portion of the through hole 51F by moving leftward from the position. The two expansion members 58 and 59 have the same configuration, and are point-symmetrically disposed with respect to a center point of the through hole 51F. Therefore, the configuration of the expansion member 58 will be mainly described, and a detailed description of the expansion member 59 will be omitted.

As illustrated in FIGS. 5 and 8 to 10, the expansion member 58 includes two plate-shaped members 58A and 58B extending in the front-rear direction and the left-right direction. The two plate-shaped members 58A and 58B have a rectangular planar shape elongated in the front-rear direction, and have a size capable of straddling the through hole 51F in the front-rear direction. Further, the two plate-shaped members 58A and 58B are arranged in a manner of being vertically shifted so as to be able to be stacked in the up-down direction. The plate-shaped member 58B is disposed above the plate-shaped member 58A.

As illustrated in FIG. 8, the two plate-shaped members 58A and 58B include a pair of leg portions 58A1 and a pair of leg portions 58B1 extending downward from both ends in the front-rear direction, respectively. These leg portions 58A1 and 58B1 are disposed on the front edge portion 51E1 and the rear edge portion 51E2 of the bottom plate 51E. The two plate-shaped members 58A and 58B are disposed to be movable along the left-right direction. Similarly, two plate-shaped members 59A and 59B constituting the expansion member 59 are also disposed to be movable along the left-right direction.

As illustrated in FIG. 9, the two plate-shaped members 58A and 58B include protrusions 58A2 and 58B2 extending upward from one ends thereof on a through hole 51F side, and protrusions 58A3 and 58B3 extending downward from the other ends thereof on a side opposite to the through hole 51F in the left-right direction, respectively. Similarly, as illustrated in FIG. 9, the two plate-shaped members 59A and 59B include protrusions 59A2 and 59B2 extending upward from one ends thereof on a through hole 51F side, and protrusions 59A3 and 59B3 extending downward from the other ends thereof on a side opposite to the through hole 51F in the left-right direction, respectively. In a state where the four plate-shaped members 58A, 58B, 59A, and 59B are disposed at the second expansion position, the protrusions 58B3 and 59B3 of the plate-shaped members 58B and 59B are engaged with the protrusions 58A2 and 59A2 of the plate-shaped members 58A and 59A, and the protrusions 58A3 and 59A3 of the plate-shaped members 58B and 59B are engaged with both left and right end portions of the annular protrusion 51G.

The first expansion position refers to a position where the expansion member 58 is disposed in FIGS. 5 and 9. That is, the two expansion members 58 and 59 are located at positions where the two expansion members 58 and 59 respectively overlap the left edge portion 51E3 and the right edge portion 51E4 as a whole and do not cover the through hole 51F. At the first expansion position according to the present embodiment, the two expansion members 58 and 59 do not cover the through hole 51F, and may partially cover the through hole 51F. That is, the two expansion members 58 and 59 may partially cover the through hole 51F as long as areas obtained by the expansion members 58 and 59 disposed at the second expansion position covering the through hole 51F are further small. The first expansion position refers to positions where the two expansion members 58 and 59 respectively face the two outermost spray nozzles 41 and the discharge direction of the processing liquid. Here, the discharge direction is a direction in which the processing liquid is discharged from the discharge port 41A of the spray nozzle 41 to the discharge range Q, and includes a vertically downward direction and an obliquely downward direction inclined with respect to the vertically downward direction. The first expansion position according to the present embodiment also refers to positions indicating a state where the so-called two expansion members 58 and 59 are stored. In other words, the expansion members 58 and 59 are respectively constituted by the plate-shaped members 58A, 58B, 59A, and 59B which contract toward the outer side in the left-right direction (the outer side of the platen 12), and the positions where the plate-shaped members 58A, 58B, 59A, and 59B are respectively stored are referred to the first expansion position.

In the present embodiment, the two expansion members 58 and 59 are disposed at the first expansion position when the printing is performed on the printing medium in a state where the first platen 12S1 as the platen 12 is supported by the platen support portion 37. Further, the two expansion members 58 and 59 disposed at the first expansion position restrict a part of the processing liquid discharged from the spray nozzles 41 from being discharged downward from the through hole 51F. More specifically, a part of the processing liquid from the two spray nozzles 41 disposed at both ends in the left-right direction and a part of the processing liquid from two spray nozzles 41 adjacent to the two spray nozzles 41 are received in a restricted manner.

The second expansion position refers to a position where the expansion member 59 is disposed in FIGS. 5 and 9. That is, the two expansion members 58 and 59 are located at positions where the two expansion members 58 and 59 do not overlap the left edge portion 51E3 and the right edge portion 51E4 as a whole, and cover both end portions of the through hole 51F in the left-right direction, respectively. The second expansion position according to the present embodiment refers to positions indicating a state where the so-called two expansion members 58 and 59 are expanded inward in the width direction of the platen 12. That is, the expansion members 58 and 59 are respectively constituted by the plate-shaped members 58A, 58B, 59A, and 59B which can be expanded from the first expansion position toward the inner side in the left-right direction (the inner side of the platen 12).

In the present embodiment, the two expansion members 58 and 59 are disposed at the second expansion position when the printing is performed on the printing medium in a state where the second platen 12S2 as the platen 12 is supported by the platen support portion 37. Further, the two expansion members 58 and 59 disposed at the second expansion position restrict a part of the processing liquid discharged from the spray nozzles 41 from being discharged downward from the through hole 51F. More specifically, a part of the processing liquids from six spray nozzles 41 other than the spray nozzle 41 disposed at the center in the left-right direction is received in a restricted manner. When the two expansion members 58 and 59 are disposed at the second expansion position, the both end portions of the through hole 51F in the left-right direction are covered, and thus a range in which the processing liquid is discharged from the through hole 51F is narrower than that when the two expansion members 58 and 59 are disposed at the first expansion position. In this way, the application range in which the processing liquid discharged from the spray nozzles 41 is applied to the printing medium is restricted by disposing the two expansion members 58 and 59 at the first expansion position or the second expansion position.

As illustrated in FIG. 9, in the state where the two expansion members 58 and 59 are disposed at the second expansion position, the two expansion members 58 and 59 are disposed in a stepped shape such that the two expansion members 58 and 59 are inclined downward toward the outer side (from the inner side to the outer side of the platen 12). Therefore, the processing liquid received by the plate-shaped members 59A and 59B flows to the right edge portion 51E4 as indicated by arrows in FIG. 9. The processing liquid received by the plate-shaped members 58A and 58B flows to the left edge portion 51E3.

Figure 11:
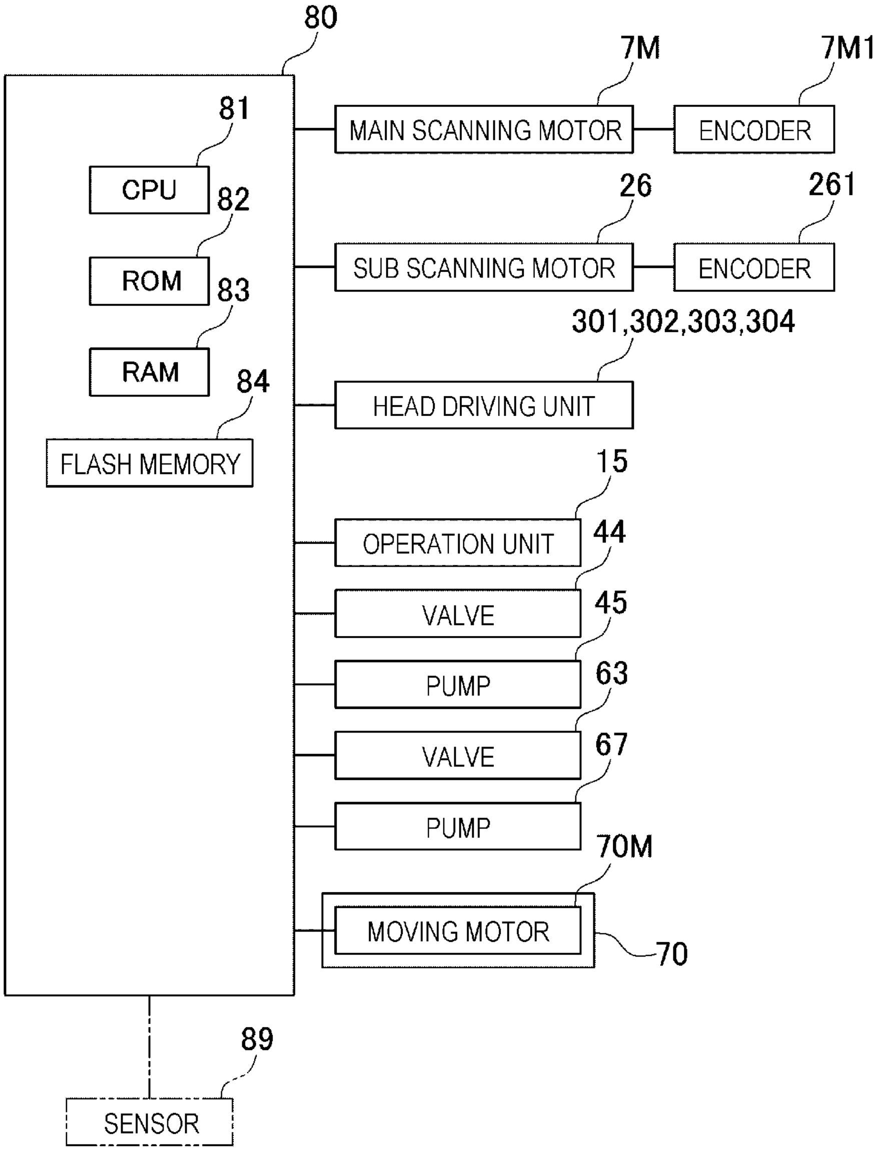
FIG. 11 is a block diagram illustrating an electrical configuration of the printing apparatus illustrated in FIG. 1.

The moving mechanism 70 moves the two expansion members 58 and 59 between the first expansion position and the second expansion position. As illustrated in FIG. 11, the moving mechanism 70 includes a moving motor 70M. In addition, the moving mechanism 70 includes a power transmission mechanism (not shown) that transmits power of the moving motor 70M and causes the two expansion members 58 and 59 to move along the left-right direction. For example, a known transmission mechanism such as a rack and a pinion is adopted as the power transmission mechanism.

An electrical configuration of the printing apparatus 1 will be described with reference to FIG. 11. The controller 80 includes a CPU 81, a ROM 82, a RAM 83, and a flash memory 84. The CPU 81 controls the printing apparatus 1, and is electrically connected to the ROM 82, the RAM 83, and the flash memory 84. The ROM 82 stores control programs for the CPU 81 to control the operation of the printing apparatus 1, information necessary for the CPU 81 to execute various programs, and the like. The ROM 82 stores positions of the carriage 6 (the heads 30) based on, for example, a rotation angle of the main scanning motor 7M, and stores positions of the platen 12 based on a rotation angle of the sub scanning motor 26. The RAM 83 temporarily stores various types of data used in the control programs. The flash memory 84 is nonvolatile and stores the printing data and the like for the printing.

As illustrated in FIG. 11, the main scanning motor 7M, the sub scanning motor 26, four head driving units 301 to 304, the operation units 15, the seven valves 44, the seven pumps 45, and the valve 63 and the pump 67 used for replenishment are electrically connected to the controller 80. The main scanning motor 7M, the sub scanning motor 26, the head driving units 301 to 304, the seven valves 44, the seven pumps 45, and the valve 63 and the pump 67 used for replenishment are driven under the control of the controller 80. Although the seven valves 44 and the seven pumps 45 are provided, one valve 44 and one pump 45 are illustrated in FIG. 4 for convenience.

The main scanning motor 7M and the sub scanning motor 26 are provided with encoders 7M1 and 261, respectively. The encoder 7M1 detects the rotation angle of the main scanning motor 7M and outputs a detection result to the controller 80. The encoder 261 detects the rotation angle of the sub scanning motor 26 and outputs a detection result to the controller 80.

The four head driving units 301 to 304 correspond to the white ink heads 31 and 32 and the color ink heads 33 and 34 in order, and are included in the heads 31 to 34, respectively. The respective head driving units 301 to 304 are implemented by a plurality of drive elements (piezoelectric elements or heating elements) capable of selectively applying energy to the ink in a plurality of individual flow paths respectively communicating with the plurality of nozzles of the heads 30. These head driving units 301 to 304 apply energy to the ink in the white ink heads 31 and 32 and the color ink heads 33 and 34 by driving the white ink heads 31 and 32 and the color ink heads 33 and 34, respectively, and selectively causes the ink to be discharged from corresponding nozzles 313, 323, 333, and 343.

Figure 12:
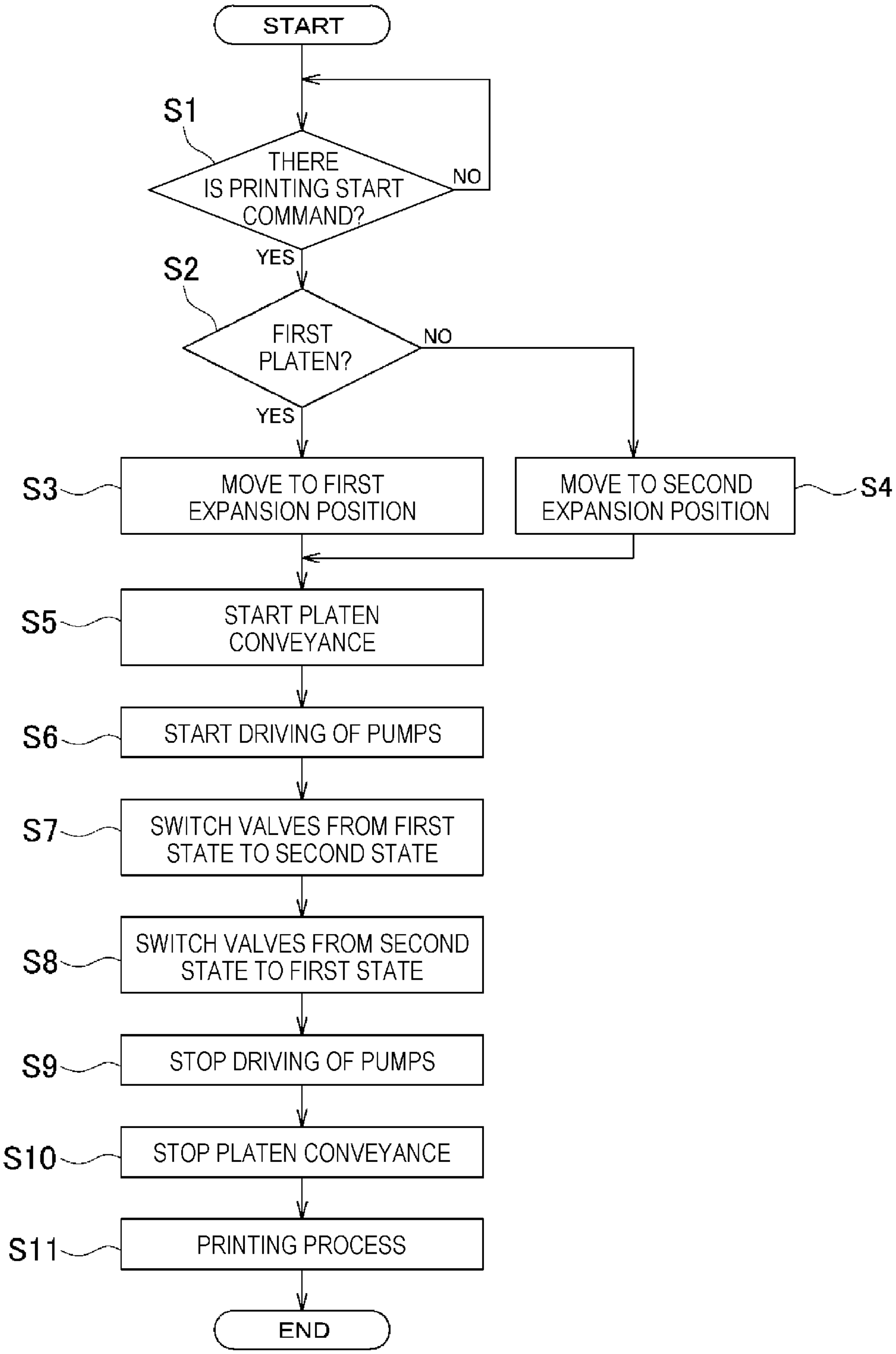
FIG. 12 is a flowchart illustrating an example of a processing procedure executed when a printing start command is input to the printing apparatus illustrated in FIG. 1.

The control of the controller 80 when the image is printed on the printing medium will be described with reference to FIG. 12. When the user operates the operation units 15 and inputs the type of the platen to be used during printing and the printing start command to the printing apparatus 1, the controller 80 reads a control program from the ROM 82 and operates to execute the flow of FIG. 12. In addition, the type of the platen according to the present embodiment is one of the first platen 12S1 and the second platen 1252, and the controller 80 obtains platen data by inputting the type of the platen to be used in current printing. Hereinafter, the flow of FIG. 12 will be described.

First, the controller 80 determines whether the printing start command is input (S1). Before the user operates the operation units 15 to input the printing start command, the user disposes the printing medium (the T-shirt) to which the processing liquid is not applied on the support surface 12A of the platen 12. The platen 12 is disposed at the setting position P1 during non-printing. In the printing apparatus 1, during non-printing, the heads 30 are normally disposed at the maintenance position B1, and capping of covering the plurality of nozzles of the heads 30 is performed by the cap as the maintenance unit (not shown). Further, the driving of all the pumps 45 and the pump 67 is stopped, and all the valves 44 are set to the first state.

When the printing start command is not input (S1: NO), S1 is repeated until the printing start command is input. On the other hand, when the printing start command is input (S1: YES), the controller 80 determines whether the platen supported by the platen support portion 37 is the first platen 12S1 based on the platen data (S2).

When the platen supported by the platen support portion 37 is the first platen 12S1 (S2: YES), the controller 80 controls the moving motor 70M such that the two expansion members 58 and 59 are disposed at the first expansion position (S3). On the other hand, when the platen supported by the platen support portion 37 is not the first platen 12S1 (S2: NO), the controller 80 determines that the second platen 12S2 is supported, and controls the moving motor 70M such that the two expansion members 58 and 59 are disposed at the second expansion position (S4).

When the two expansion members 58 and 59 are disposed at the first expansion position in S3, the application range of the processing liquid discharged from the spray nozzles 41 is restricted to an application range K1. On the other hand, when the two expansion members 58 and 59 are disposed at the second expansion position in S4, the application range of the processing liquid discharged from the spray nozzles 41 is restricted to an application range K2. When the restriction member 50 is assumed to not be provided, the application range of the processing liquid discharged from the spray nozzles 41 is not restricted, and thus there is a possibility that a portion of the platen support portion 37 outside the platen 12, an installation surface of the printing apparatus 1 (mainly, a front side of the printing apparatus), and the like may be contaminated. However, in the present embodiment, the application range of the processing liquid is restricted to one of the application ranges K1 and K2 by the two expansion members 58 and 59, and thus it is possible to restrain the contamination caused by the processing liquid described above.

Figure 13A:
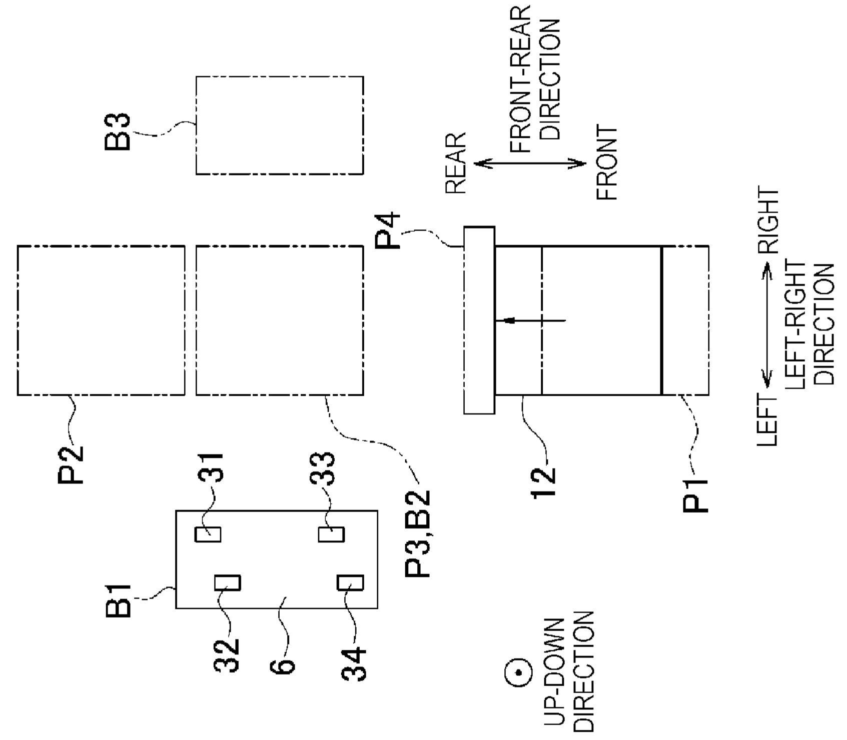
FIG. 13A is a diagram illustrating a situation when a platen reaches a processing liquid discharge region from a setting position.
Figure 13B:
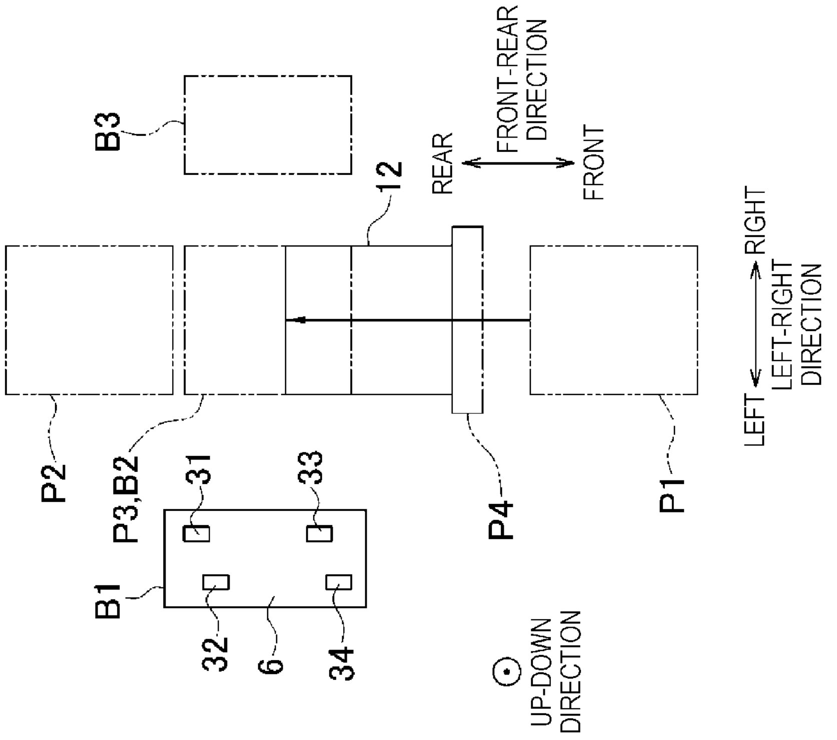
FIG. 13B is a diagram illustrating a situation when the platen passes through the processing liquid discharge region.

Next, as illustrated in FIG. 13A, the controller 80 controls the sub scanning motor 26 to start the conveyance of the platen 12 from the setting position P1 toward the processing liquid discharge region P4 (S5).

Next, the controller 80 stops the driving of all the pumps 45 (S6). At this time, since the valve 44 is set to the first state, the processing liquid in the sub tank 49 flows from the supply pipe 42 of the corresponding spray nozzle 41 to the circulation pipe 43 and circulates to the sub tank 49 by the driving of the pump 45. Accordingly, a supply pressure of the processing liquid flowing through the supply pipe 42 can be increased by the corresponding pump 45.

Although in the present embodiment, all the seven pumps 45 are driven in S6, when the two expansion members 58 and 59 are disposed at the second expansion position, among the seven spray nozzles 41, five pumps 45 other than two pumps 45 for discharging the processing liquid from the two outermost spray nozzles 41 in the left-right direction may be driven. In this way, it is possible to restrain the unnecessary discharge of the processing liquid from the two outermost spray nozzles 41. When the two expansion members 58 and 59 are disposed at the first expansion position, the seven pumps 45 for discharging the processing liquid from the seven spray nozzles 41 may be driven.

Next, the controller 80 controls all the valves 44 such that the valves 44 are switched from the first state to the second state at a timing when the platen 12 reaches the processing liquid discharge region P4 (S7). Accordingly, the communication between the circulation pipe 43 and the supply pipe 42 is cut off, the pump 45 and the spray nozzle 41 communicate with each other, and the processing liquid is supplied from the supply pipe 42 to the spray nozzle 41 at a predetermined pressure or higher. Therefore, the processing liquid is discharged in the form of mist from the spray nozzle 41 almost at the same time as a switching timing of the valve 44. Therefore, the processing liquid discharged in the form of mist is applied to the printing medium supported by the platen 12 passing through the processing liquid discharge region P4. As a result, the lower base layer is formed by substantially uniformly applying the processing liquid onto the printing medium.

When the two expansion members 58 and 59 are disposed at the first expansion position, the processing liquid is discharged from the through hole 51F such that the application range of the processing liquid is the application range K1. When the two expansion members 58 and 59 are disposed at the second expansion position, the processing liquid is discharged from the through hole 51F such that the application range of the processing liquid is the application range K2.

In the state where the two expansion members 58 and 59 are disposed at the first expansion position, the processing liquid discharged to the outside of the through hole 51F in the left-right direction can be received by the plate-shaped members 58B and 59B, and the application range of the processing liquid discharged from the spray nozzles 41 can be restricted to the application range K1. Therefore, the processing liquid is discharged from the entire through hole 51F, and the processing liquid can be discharged to the entire first platen 12S1. In addition, the processing liquid received by the plate-shaped members 58B and 59B flows to the left edge portion 51E3 and the right edge portion 51E4, and is recovered in the recovery tank 61 via the groove 52B, the discharge port 53, and the recovery pipe 64. The processing liquid received by the groove 52A is similarly recovered in the recovery tank 61.

In the state where the two expansion members 58 and 59 are disposed at the second expansion position, the processing liquid discharged to the outside of the through hole 51F, which is not covered by the expansion members 58 and 59, in the left-right direction can be received by the plate-shaped members 58A, 58B, 59A and 59B, the left edge portion 51E3 and the right edge portion 51E4, and the application range of the processing liquid discharged from the spray nozzles 41 can be restricted to the application range K2. Therefore, the processing liquid can be discharged from a portion of the through hole 51F which is not covered by the expansion members 58 and 59, and the processing liquid can be discharged to the entire second platen 12S2. The processing liquid received by the two expansion members 58 and 59, the left edge portion 51E3, and the right edge portion 51E4 is recovered from the left edge portion 51E3 and the right edge portion 51E4 to the recovery tank 61 via the groove 52B, the discharge port 53, and the recovery pipe 64. The processing liquid received by the groove 52A is similarly recovered in the recovery tank 61.

Next, the controller 80 controls all the valves 44 such that the valves 44 are switched from the second state to the first state at a timing when the platen 12 passes through the processing liquid discharge region P4 (S8). Accordingly, the communication between the pump 45 and the spray nozzle 41 is cut off, the circulation pipe 43 and the supply pipe 42 communicate with each other, and the processing liquid flows from the supply pipe 42 to the circulation pipe 43 and circulates to the sub tank 49. Therefore, the supply of the processing liquid to the spray nozzle 41 is stopped, and the discharge of the processing liquid from the spray nozzle 41 is stopped almost at the same time as a switching timing of the valve 44. In the present embodiment, the processing liquid is controlled to be applied to an entire surface of the printing medium by controlling the processing liquid to be discharged to the entire support surface 12A of the platen 12, and the processing liquid may be applied to only a part of the printing medium in the front-rear direction by appropriately changing the switching timings of the valve 44 in S7 and S8. When the processing liquid is applied to only a part of the printing medium, the processing liquid may be applied to only a region corresponding to an image range formed by discharging the ink onto the printing medium.

Next, the controller 80 stops the driving of all the pumps 45 (S9). Although S9 is executed immediately after S8 in the present embodiment, S8 and S9 may be simultaneously executed. In either case, the dripping of the processing liquid from the spray nozzle 41 can be restrained. Further, as the time from the switching timing of the valve 44 in S8 to the stop of the driving of the pump 45 decreases, it is possible to reduce an unnecessary driving time of the pump 45, and thus it is possible to extend a service life of the pump 45.

Next, the controller 80 controls the sub scanning motor 26 to stop the platen conveyance when the platen 12 reaches the pre-printing standby position P2 based on the detection result from the encoder 261 (S10).

Next, the controller 80 executes a printing process of printing the image on the printing medium (S11). The controller 80 controls the sub scanning motor 26 based on the detection result from the encoder 261 to move the platen 12 from the pre-printing standby position P2 to the printing conveyance region P3.

Then, the controller 80 controls the main scanning motor 7M based on the detection result from the encoder 7M1 to move the carriage 6 from the maintenance position B1 to the discharge region B2 and cause the heads 30 to face the printing medium placed on the platen 12.

The controller 80 performs the printing on the printing medium by controlling the head driving units 301 to 304, the main scanning motor 7M, and the sub scanning motor 26 and alternately repeating the discharge scanning and the forward movement of the platen 12 in a state where at least a part of the platen 12 is located in the printing conveyance region P3 and a state where the carriage 6 is located in the discharge region B2. That is, since the platen 12 is conveyed forward from the pre-printing standby position P2 to the printing conveyance region P3 at the time of the printing on the printing medium, first, the white ink is discharged from the nozzles of the white ink heads 31 and 32 onto the lower base layer of the printing medium formed by applying the processing liquid, and the base (mainly for the color ink) is formed. Then, the platen 12 passes through the white ink heads 31 and 32, the ink is discharged from the nozzles of the color ink heads 33 and 34 onto the base formed on the printing medium, and the image is formed. The part representing the white of the image is a base portion formed by using the white ink. Therefore, the color ink is not discharged onto the base portion.

Next, when the printing on the printing medium based on the printing data is ended (the printing process is ended), the controller 80 controls the sub scanning motor 26 based on the detection result from the encoder 261 to stop the platen 12 at the setting position P1. The user removes the printing medium on which the image is formed from the platen 12 disposed at the setting position P1. At this time, the controller 80 controls the main scanning motor 7M based on the detection result from the encoder 7M1 to move the carriage 6 leftward from the discharge region B2 and stop the carriage 6 at the maintenance position B1. Thus, the flow in FIG. 12 ends.

In addition, the controller 80 may drive the pump 67 at an appropriate timing to replenish the processing liquid from the recovery tank 61 or the main tank 62 into the sub tank 49. When the processing liquid in the main tank 62 is replenished into the sub tank 49, the controller 80 controls to set the valve 63 to the first replenishment state. When the processing liquid recovered in the recovery tank 61 is replenished into the sub tank 49, the controller 80 controls to set the valve 63 to the second replenishment state. The appropriate timing described above is a timing indicating that the amount of the processing liquid in the sub tank 49 is reduced, and the operation may be performed at, for example, a timing based on a detection signal from a float sensor for detecting a lower limit of a liquid amount in the sub tank 49, the float sensor is provided in the sub tank 49, or a timing when the consumption of the processing liquid derived from the driving time of the pump 45 for causing the processing liquid to be discharged from the spray nozzle 41 becomes a predetermined amount or more. As a different timing, the above operation may be performed at, for example, a timing based on a detection signal from a float sensor for detecting an upper limit of a liquid amount in the recovery tank 61, the float sensor is provided in the recovery tank 61.

The processing liquid recovered in the recovery tank 61 may not be reused. In this case, the recovery tank 61 can be used as a waste liquid tank.

As described above, according to the printing apparatus 1 of the present embodiment, the application range of the processing liquid can be restricted to the application ranges K1 and K2 according to the size of the platen 12 by disposing the two expansion members 58 and 59 (the restriction member 50) at the first expansion position or the second expansion position. Therefore, it is possible to restrain the processing liquid from flowing to the outside of the platen 12 or the printing medium in the left-right direction. Therefore, it is possible to restrain the processing liquid from adhering to a device supporting the platen 12 (the printing apparatus 1 including the platen support portion 37) and an installation surface on which the device is installed, and from contaminating the device and the installation surface.

The restriction member 50 includes the two expansion members 58 and 59 respectively including the plate-shaped members 58A, 58B, 59A, and 59B. Accordingly, the application range of the processing liquid can be restricted along the width direction of the platen 12.

The two expansion members 58 and 59 are expandable toward the inner side of the platen 12 from the first expansion position in the left-right direction. There is a high possibility that the processing liquid discharged from the two outermost spray nozzles 41 flows to the outside of the platen 12. However, in the left-right direction, the two expansion members 58 and 59 expand toward the inner side of the platen 12 from the positions (the first expansion position) facing the spray nozzles 41 disposed on the outermost side and the discharge direction. Therefore, it is possible to further restrain the processing liquid from adhering to the device supporting the platen 12 (the printing apparatus 1 including the platen support portion 37) and the installation surface on which the device is installed, and from contaminating the device and the installation surface.

The platen support portion 37 can support the first platen 12S1 and the second platen 12S2, and is configured such that the two expansion members 58 and 59 are expandable in response to the width of the platen 12. Accordingly, it is possible to expand and contract the expansion members 58 and 59 according to the width of the platen 12 supported by the platen support portion 37, that is, the width of the first platen 12S1 or the second platen 12S2. Therefore, the application range can be restricted according to the width of the platen 12.

The controller 80 controls the moving motor 70M to move the two expansion members 58 and 59 to the first expansion position or the second expansion position based on the platen data. Accordingly, it is possible to move the two expansion members 58 and 59 based on the platen data, and it is possible to reduce the time and effort for the user to move the two expansion members 58 and 59.

The processing liquid discharge unit 40 includes the recovery tank 61 and the recovery pipe 64. Accordingly, when the application range is restricted to the application ranges K1 and K2 by the two expansion members 58 and 59, the processing liquid received by the expansion members 58 and 59 can be recovered in the recovery tank 61.

The two expansion members 58 and 59 are inclined downward from the inner side to the outer side of the platen 12 in the left-right direction. Accordingly, it is possible to guide the processing liquid received by the expansion members 58 and 59 from the inner side to the outer side of the platen 12, so that it is possible to reduce the dripping of the processing liquid received by the expansion members 58 and 59 onto the platen 12 or the printing medium placed on the platen 12.

As a first modification, in S2, the controller 80 may determine whether the width of the image during current printing in the left-right direction is larger than the width of the second platen 1252 in the left-right direction based on the image range data included in the printing data, and determine the expansion positions of the two expansion members 58 and 59. That is, when the width of the image in the left-right direction is larger than the width of the second platen 1252 (S2: YES), the controller 80 proceeds to S3 described above. On the other hand, when the width of the image in the left-right direction is equal to or less than the width of the second platen 1252 (S2: NO), the controller 80 proceeds to S4. Also in this case, the same effect as described above can be obtained.

In the embodiment described above and the first modification, the controller 80 determines the expansion positions of the two expansion members 58 and 59 based on the platen data or the image range data and controls the moving mechanism 70 to move the two expansion members 58 and 59, and the user may manually move the two expansion members 58 and 59 according to the size of the first platen 12S1 or the second platen 12S2 used as the platen 12. In this case, the moving mechanism 70 may not be provided. Further, the control of the controller 80 is simplified.

As a second modification, the processing liquid discharge unit 40 may include a sensor 89 (see FIG. 11) for detecting whether the platen 12 supported by the platen support portion 37 is the first platen 12S1 or the second platen 12S2. A known sensor such as a proximity sensor or a limit switch can be adopted as the sensor 89 according to the present modification. The sensor 89 may be provided in the platen support portion 37 in advance. In this case, the user may manually move the two expansion members 58 and 59 to the first expansion position or the second expansion position based on a detection signal of the sensor 89. In addition, in S2 described above, the controller 80 may determine whether the positions at which the two expansion members 58 and 59 are expanded are the first expansion position or the second expansion position based on the detection signal of the sensor 89. Then, when it is determined that the positions are the first expansion position (S2: YES), the controller 80 proceeds to S3 described above. On the other hand, when it is determined that the positions are the second expansion position (S2: NO), the controller 80 proceeds to S4 described above. Also in this case, the same effect as described above can be obtained.

The sensor 89 according to the second modification described above may detect the width of the printing medium in the left-right direction. The controller 80 may determine whether the positions at which the two expansion members 58 and 59 are expanded are the first expansion position or the second expansion position according to the width of the printing medium based on the detection signal of the sensor 89. Also in this case, the user may manually move the two expansion members 58 and 59 to the first expansion position or the second expansion position based on the detection signal of the sensor 89. In addition, in S2 described above, the controller 80 may determine whether the positions at which the two expansion members 58 and 59 are expanded are the first expansion position or the second expansion position based on the detection signal of the sensor 89. Then, the same control as that described above may be performed. Also in this case, the same effect as that of the second modification can be obtained.

Although the preferred embodiment of the present disclosure have been described above, the present disclosure is not limited to the embodiment described above, and various modifications can be made within the scope of the claims.

In the embodiment described above, the restriction member 50 includes the tubular member 51 and the two expansion members 58 and 59, and the restriction member 50 may include only the tubular member 51. In this case, the processing liquid discharged from the spray nozzle 41 is discharged only from the range of the through hole 51F. That is, the application range of the processing liquid is restricted to the application range K1. Also in this case, when the first platen 12S1 is used as the platen 12, the same effect as described above can be obtained. Further, the tubular member 51 at this time may not include the bottom plate 51E. Also in this case, the application range of the processing liquid is restricted by the left plate 51C and the right plate 51D, and the same effect as described above can be obtained.

Further, the restriction member 50 may include only the two expansion members 58 and 59 and a support portion (for example, the bottom plate 51E) that supports the two expansion members 58 and 59 so as to be movable in the left-right direction. Also in this case, the same effect as described above can be obtained. Further, the two expansion members 58 and 59 may be formed of a single plate-shaped member.

Also in this case, the application range of the processing liquid discharged from the spray nozzle 41 can be restricted by the plate-shaped member, and the same effect as that of the embodiment described above can be obtained. In addition, the plate-shaped member itself may be inclined downward from the inner side to the outer side of the platen 12 in the left-right direction.

In the embodiment described above, the two expansion members 58 and 59 are disposed at the first expansion position or the second expansion position, and the two expansion members 58 and 59 may be disposed at an intermediate position between the first expansion position and the second expansion position according to a width size of the platen 12 (when the width of the platen 12 is set to three types or more) and a width size of the printing medium. In this case, the plate-shaped members 58B and 59B may be disposed at the positions where both left and right end portions of the through hole 51F are covered while the plate-shaped members 58A and 59A are disposed at the first expansion position. Also in this modification, the same effect can be obtained in the same configuration as that described above.

The application ranges K1 and K2 described above may be restricted to an appropriate size by the restriction member, and may not correspond to the size of the platen. In short, in order to restrain the excessive spread of the processing liquid discharged from the spray nozzle 41 and the contamination of the surroundings by the processing liquid, the application range of the processing liquid may be restricted to a desired application range.

In addition, the processing liquid discharge unit 40 may not include the recovery tank 61, the main tank 62, the valve 63, the recovery pipe 64, the first replenishment pipe 65, the second replenishment pipe 66, the pump 67, and the like. In this case, the processing liquid may be replenished by a different supply device at the timing when the amount of the processing liquid in the sub tank 49 decreases.

Further, as a configuration for supplying the processing liquid to the spray nozzle 41, the processing liquid discharge unit 40 may include only the sub tank 49, the supply pipe 42, and the pump 45. That is, the circulation pipe 43, the valve 44, and the filter 46 may not be included.

In addition, the processing liquid discharge unit 40 according to the embodiment described above has seven spray nozzles 41, and the processing liquid discharge unit 40 may have one to six, eight or more spray nozzles 41. In this case, the supply pipe 42, the circulation pipe 43, the valve 44, and the pump 45 may be provided corresponding to the respective spray nozzles 41 in advance. Further, the supply pipe 42 connecting the valve 44 and the spray nozzle 41 may be branched and connected to the plurality of spray nozzles 41. In this way, it possible to reduce the number of the provided valves 44 and the number of the provided pumps 45.

Further, the processing liquid discharge unit 40 discharges the processing liquid for forming the lower base layer from the spray nozzle 41, and may discharge a processing liquid for overcoating the image on the printing medium from the spray nozzle 41. That is, the processing liquid may be discharged onto the printing medium after the ink is discharged onto the printing medium to form the image. In this case, the same process as in S6 may be executed after the printing process in S11, that is, until the platen 12 passes through the printing conveyance region P3 and then reaches the processing liquid discharge region P4, and then the same process as in S7 may be executed when the platen 12 reaches the processing liquid discharge region P4. In this way, the image on the printing medium can be overcoated with the processing liquid (to form the upper base layer of the ink). Further, the application range of the processing liquid discharged from the spray nozzle 41 at this time is restricted to the application ranges K1 and K2 by the two expansion members 58 and 59. Therefore, the same effect as that of the embodiment described above can be obtained.

The conveyance mechanism 14 may not include the sub scanning motor 26. In this case, the platen 12 may be moved manually. In other words, the conveyance mechanism may have a configuration capable of moving the platen 12 between the setting position P1 and the passing position where the platen 12 passes through the processing liquid discharge region P4.

The heads 30 according to the embodiment described above and the modifications have been described as an example in which the present disclosure is applied to a printing apparatus including a serial head that discharges an ink from a plurality of nozzles while moving along the main scanning direction (the left-right direction) by the moving mechanism 7, but the present disclosure is not limited thereto. For example, the present disclosure can also be applied to a printing apparatus including a line head extending over the entire length of the printing medium (the platen 12) in the main scanning direction and disposed not to be movable in the discharge region B2.

The platen support portion 37 described above may simultaneously support both the first platen 12S1 and the second platen 12S2 side by side in the front-rear direction. Also in this case, the two expansion members 58 and 59 may be disposed at the first expansion position or the second expansion position respectively corresponding to the first platen 12S1 or the second platen 12S2 used during current printing. Also in this case, the same effect as described above can be obtained.

In the controller 80 according to the embodiment described above and the modifications, a microcomputer, an application specific integrated circuit (ASIC), a field programmable gate array (FPGA), or the like may be used as a processor instead of the CPU 81. In this case, a main process may be distributed and executed by a plurality of processors. A non-transitory storage medium such as the ROM 82 and the flash memory 84 may be any storage medium capable of storing information in advance regardless of a period during which the information is stored. The non-transitory storage medium may not include a transitory storage medium (for example, a transmitted signal). For example, the control programs may be downloaded (that is, transmitted as transmission signals) from a server connected to a network (not shown) and stored in the ROM 82 or the flash memory 84. In this case, the control programs may be stored in a non-transitory storage medium such as an HDD provided in the server.

The printing apparatus 1 according to the embodiment described above and the modifications includes the heads 30, the moving mechanism 7, and the like used for forming the image on the printing medium, and may include the processing liquid application device including the processing liquid discharge unit 40, the platen 12, the conveyance mechanism 14, the operation units 15 and the controller 80. That is, the processing liquid application device is not particularly limited to the printing apparatus.

In the embodiment described above and the modifications, the volatile component of the processing liquid includes an organic acid, but the present disclosure is not limited thereto. That is, the volatile component of the processing liquid may include a component other than the organic acid, which reacts with the ink in the nozzles to cause aggregation or discoloration. Further, the processing liquid may not contain the volatile component such as the organic acid.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A processing liquid application device, comprising:

a spray nozzle configured to discharge a processing liquid for forming a lower base layer or an upper base layer of an ink discharged onto a printing medium by an ink jet printer;

a platen support portion disposed at a position facing the spray nozzle in a discharge direction of the processing liquid from the spray nozzle and configured to support a platen on which the printing medium is placed; and a restriction member disposed between the spray nozzle and the platen and configured to restrict an application range of the processing liquid discharged from the spray nozzle, wherein the restriction member is a plate-shaped member that is configured to expand toward an inner side of the platen and to contract toward an outer side of the platen in a width direction of the platen.

2. The processing liquid application device according to claim 1, wherein the spray nozzle includes a plurality of spray nozzles being arranged along the width direction of the platen, and wherein the restriction member is configured to expand toward the inner side of the platen from a position facing, in the discharge direction, an outermost spray nozzle of the plurality of spray nozzles in the width direction.

3. The processing liquid application device according to claim 1, wherein the platen support portion is configured to support a first platen having a first width and a second platen having a second width different from the first width, and wherein the restriction member is configured to expand in response to each of the first width and the second width.

4. The processing liquid application device according to claim 1, wherein the platen includes a first platen having a first width and a second platen having a second width different from the first width, wherein the platen support portion is configured to support the first platen and the second platen, and wherein the processing liquid application device further comprises:

a moving mechanism configured to selectively move the restriction member to a first expansion position corresponding to the first width and a second expansion position corresponding to the second width; and a controller, and wherein the controller obtains platen data indicating the type of the platen for identifying one of the first platen or the second platen that is supported by the platen support portion, and controls the moving mechanism such that the restriction member moves to the first expansion position or the second expansion position based on the obtained platen data.

5. The processing liquid application device according to claim 1, further comprising:

a moving mechanism configured to move the restriction member; and a controller, wherein the controller obtains image range data indicating a range of an image to be printed on the printing medium, and controls the moving mechanism such that the restriction member moves based on the acquired image range data.

6. The processing liquid application device according to claim 1, further comprising a sensor configured to perform detection to determine an expansion position of the restriction member.

7. The processing liquid application device according to claim 1, further comprising:

a sensor configured to perform detection to determine an expansion position of the restriction member;

a moving mechanism configured to move the restriction member; and a controller, wherein the controller controls the moving mechanism such that the restriction member moves to the expansion position based on a detection signal from the sensor.

8. The processing liquid application device according to claim 1, further comprising:

a tank; and a recovery flow path through which the processing liquid received by the restriction member restricting the application range flows to the tank and is recovered.

9. The processing liquid application device according to claim 1, wherein the restriction member has a region inclined downward from the inner side toward the outer side of the platen.

10. A processing liquid application device, comprising:

a spray nozzle configured to discharge a processing liquid for forming a lower base layer or an upper base layer of an ink discharged onto a printing medium by an ink jet printer;

a platen support portion disposed at a position facing the spray nozzle in a discharge direction of the processing liquid from the spray nozzle and configured to support a platen on which the printing medium is placed; and a restriction member configured to restrict an application range of the processing liquid discharged from the spray nozzle, wherein the platen support portion is located at a position where the restriction member is disposed between the spray nozzle and the platen in the discharge direction, wherein the restriction member is a plate-shaped member that is configured to expand toward an inner side of the platen and to contract toward an outer side of the platen in a width direction of the platen.

* * * * *